United States Patent
Itamochi

(10) Patent No.: US 11,410,816 B2
(45) Date of Patent: Aug. 9, 2022

(54) MULTILAYER CERAMIC ELECTRONIC COMPONENT INCLUDING METAL TERMINALS CONNECTED TO OUTER ELECTRODES

(71) Applicant: Murata Manufacturing Co., Ltd., Nagaokakyo (JP)

(72) Inventor: Masakazu Itamochi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 170 days.

(21) Appl. No.: 16/443,933

(22) Filed: Jun. 18, 2019

(65) Prior Publication Data

US 2020/0006002 A1    Jan. 2, 2020

(30) Foreign Application Priority Data

Jun. 27, 2018    (JP) .............................. JP2018-122473

(51) Int. Cl.
*H01G 4/232*     (2006.01)
*H01G 4/38*      (2006.01)
(Continued)

(52) U.S. Cl.
CPC ............. *H01G 4/248* (2013.01); *H01G 4/012* (2013.01); *H01G 4/1227* (2013.01);
(Continued)

(58) Field of Classification Search
CPC ............ H01G 4/30; H01G 4/38; H01G 4/224; H01G 4/1236; H01G 4/1227; H01G 4/012; H01G 4/2325; H01G 4/248
See application file for complete search history.

(56) References Cited

U.S. PATENT DOCUMENTS 6,288,887 B1     9/2001 Yoshida et al.
7,345,868 B2*    3/2008 Trinh .................. H01G 4/2325
                                                     361/303
(Continued)

FOREIGN PATENT DOCUMENTS

CN       1707709 A     12/2005
CN     101206952 A      6/2008
(Continued)

OTHER PUBLICATIONS

Official Communication issued in corresponding Korean Patent Application No. 10-2019-0075388, dated Jul. 16, 2020.
(Continued)

*Primary Examiner* — David M Sinclair
(74) *Attorney, Agent, or Firm* — Keating & Bennett, LLP

(57) ABSTRACT

A multilayer ceramic electronic component includes a multilayer ceramic electronic component body and a pair of metal terminals. The multilayer ceramic electronic component body includes a multilayer body including laminated ceramic layers and inner electrode layers and first and second outer electrodes provided on both end surfaces of the multilayer body. The metal terminals are connected to the outer electrodes. The inner electrode layers are perpendicular or substantially perpendicular to a mounting surface and include extended portions that extend to the end surfaces and portions of the first and second side surfaces. The distance between ends of the first and second outer electrodes on one of the first and second side surfaces is in a range from about 1.8% to about 31.3% of a length dimension of the multilayer ceramic electronic component in a direction connecting both end surfaces of the multilayer ceramic electronic component body.

20 Claims, 24 Drawing Sheets

(51) Int. Cl.
*H01G 4/30* (2006.01)
*H01G 4/224* (2006.01)
*H01G 4/248* (2006.01)
*H01G 4/012* (2006.01)
*H01G 4/12* (2006.01)

(52) U.S. Cl.
CPC ........... *H01G 4/1236* (2013.01); *H01G 4/224* (2013.01); *H01G 4/2325* (2013.01); *H01G 4/30* (2013.01); *H01G 4/38* (2013.01)

(56) References Cited

U.S. PATENT DOCUMENTS

| | | | |
|---|---|---|---|
| 9,111,690 B2 * | 8/2015 | Motoki | H01C 1/148 |
| 2002/0080550 A1 | 6/2002 | Hidaka et al. | |
| 2005/0128678 A1 | 6/2005 | Hidaka et al. | |
| 2008/0130199 A1 | 6/2008 | Omura | |
| 2008/0144253 A1 | 6/2008 | Togashi | |
| 2008/0310076 A1 | 12/2008 | Ritter et al. | |
| 2009/0002921 A1 * | 1/2009 | Ritter | H01C 1/148 |
| | | | 361/321.3 |
| 2009/0080146 A1 * | 3/2009 | Horio | H01G 9/08 |
| | | | 361/541 |
| 2009/0147440 A1 * | 6/2009 | Cygan | H01G 4/232 |
| | | | 361/306.3 |
| 2011/0102969 A1 * | 5/2011 | Togashi | H01G 4/30 |
| | | | 361/306.3 |
| 2011/0235232 A1 * | 9/2011 | Takeuchi | H01G 4/30 |
| | | | 361/301.1 |
| 2011/0267736 A1 * | 11/2011 | Sasabayashi | H01G 4/30 |
| | | | 361/301.1 |
| 2014/0118882 A1 * | 5/2014 | Masuda | H01G 4/2325 |
| | | | 361/321.2 |
| 2014/0268487 A1 | 9/2014 | Yoshida | |
| 2014/0367152 A1 | 12/2014 | Lee et al. | |
| 2015/0114697 A1 * | 4/2015 | Murrell | H01G 4/232 |
| | | | 174/255 |
| 2016/0219739 A1 | 7/2016 | Park et al. | |
| 2016/0309578 A1 | 10/2016 | Park | |
| 2017/0164479 A1 * | 6/2017 | Park | H01G 2/065 |
| 2017/0169950 A1 * | 6/2017 | Nakanishi | H01G 4/1236 |
| 2017/0169956 A1 * | 6/2017 | Miller | H01G 4/40 |
| 2017/0186539 A1 * | 6/2017 | Masuda | H01G 4/248 |
| 2018/0240596 A1 * | 8/2018 | Son | H01G 4/248 |
| 2018/0247768 A1 * | 8/2018 | Koini | H01G 4/232 |
| 2019/0304691 A1 * | 10/2019 | Ando | H01G 4/232 |

FOREIGN PATENT DOCUMENTS

| | | | |
|---|---|---|---|
| CN | 104240950 A | | 12/2014 |
| JP | 62-7109 A | | 1/1987 |
| JP | 03-159105 A | | 7/1991 |
| JP | 04324920 A | * | 11/1992 |
| JP | 09266125 A | * | 10/1997 |
| JP | 2000-235932 A | | 8/2000 |
| JP | 2002-025852 A | | 1/2002 |
| JP | 2004039937 A | * | 2/2004 |
| JP | 2004-140183 A | | 5/2004 |
| JP | 2004140183 A | * | 5/2004 |
| JP | 2004-273935 A | | 9/2004 |
| JP | 2004273935 A | * | 9/2004 |
| JP | 2005-197627 A | | 7/2005 |
| JP | 2005-311217 A | | 11/2005 |
| JP | 2006-012956 A | | 1/2006 |
| JP | 2006216622 A | * | 8/2006 |
| JP | 2008-130954 A | | 6/2008 |
| JP | 2008-153294 A | | 7/2008 |
| JP | 2008-172050 A | | 7/2008 |
| JP | 2008-277505 A | | 11/2008 |
| JP | 2009-060080 A | | 3/2009 |
| JP | 2011-204794 A | | 10/2011 |
| JP | 2011-233840 A | | 11/2011 |
| JP | 2014-179512 A | | 9/2014 |
| JP | 2014-203862 A | | 10/2014 |
| JP | 2016-139787 A | | 8/2016 |
| JP | 2016-208003 A | | 12/2016 |
| KR | 10-2008-0010435 A | | 1/2008 |
| WO | 2017/100073 A1 | | 6/2017 |

OTHER PUBLICATIONS

Official Communication issued in corresponding Japanese Patent Application No. 2018-122473, dated Oct. 20, 2020.
Official Communication issued in corresponding Chinese Patent Application No. 201910565887.1, dated Mar. 2, 2021.

* cited by examiner

SECTION ALONG III-III

SECTION ALONG IV-IV

SECTION ALONG X-X

SECTION ALONG XI-XI

SECTION ALONG XXVII-XXVII

MULTILAYER CERAMIC ELECTRONIC COMPONENT INCLUDING METAL TERMINALS CONNECTED TO OUTER ELECTRODES

CROSS REFERENCE TO RELATED APPLICATIONS

This application claims the benefit of priority to Japanese Patent Application No. 2018-122473 filed on Jun. 27, 2018. The entire contents of this application are hereby incorporated herein by reference.

BACKGROUND OF THE INVENTION

1. Field of the Invention

The present invention relates to multilayer ceramic electronic components including metal terminals, and more particularly, to multilayer ceramic electronic components each including two metal terminals connected to outer electrodes of multilayer ceramic electronic component bodies.

2. Description of the Related Art

In recent years, inverter circuits suitable for achieving less energy consumption and higher efficiency have been used in consideration of environmental protection. With increasing working voltage, electronic components operable at higher voltages and currents have been desired.

When an electronic component, such as a multilayer ceramic capacitor, is operated at a high voltage, discharge between outer electrodes, that is, creeping discharge, easily occurs. Accordingly, there is an official standard that specifies a creeping distance for high-voltage inverter circuits.

Accordingly, film capacitors with which the creeping distance is able to be easily increased, as disclosed in Japanese Unexamined Patent Application Publications No. 2008-172050 and Japanese Unexamined Patent Application Publication No. 2008-277505, and capacitors including metal terminals as disclosed in Japanese Unexamined Patent Application Publication No. 2000-235932 have come into widespread use as capacitors for high-voltage inverter circuits.

Although the film capacitors disclosed in Japanese Unexamined Patent Application Publications No. 2008-172050 and Japanese Unexamined Patent Application Publication No. 2008-277505 have sufficient creeping distances, the size thereof cannot be reduced due to structural reasons. In addition, the film capacitors require lead terminals due to structural reasons, and may only be mounted by inserting the lead terminals into a mounting board. Therefore, the film capacitors do not meet the recent market demands for smaller components that are surface-mountable without using lead wires.

The capacitor including metal terminals disclosed in Japanese Unexamined Patent Application Publication No. 2000-235932 does not have a sufficient creeping distance. In addition, since the metal terminals are provided, the equivalent series resistance (ESR) and thermal resistance are high, and the multilayer ceramic capacitor generates a large amount of heat.

SUMMARY OF THE INVENTION

Preferred embodiments of the present invention provide small surface-mountable multilayer ceramic electronic components with each of which creeping discharge and heat generation are able to be reduced.

A multilayer ceramic electronic component according to a preferred embodiment of the present invention includes a multilayer ceramic electronic component body, a first metal terminal, and a second metal terminal. The multilayer ceramic electronic component body includes a multilayer body including a plurality of ceramic layers that are laminated and a plurality of inner electrode layers that are laminated, the multilayer body including a first principal surface and a second principal surface that are opposite to each other in a lamination direction, a first side surface and a second side surface that are opposite to each other in a width direction orthogonal or substantially orthogonal to the lamination direction, and a first end surface and a second end surface that are opposite to each other in a length direction orthogonal or substantially orthogonal to the lamination direction and the width direction; a first outer electrode provided on the first end surface, at least a portion of the first side surface, and at least a portion of the second side surface of the multilayer body; and a second outer electrode provided on the second end surface, at least a portion of the first side surface, and at least a portion of second side surface of the multilayer body. The first metal terminal is connected to the first outer electrode. The second metal terminal is connected to the second outer electrode. The inner electrode layers include a first inner electrode layer and a second inner electrode layer. The first inner electrode layer includes a facing portion that faces the second inner electrode layer and an extended portion that extends to the first end surface, a portion of the first side surface, and a portion of the second side surface. The second inner electrode layer includes a facing portion that faces the first inner electrode layer and an extended portion that extends to the second end surface, a portion of the first side surface, and a portion of the second side surface. The multilayer ceramic electronic component body is positioned such that one of the first and second side surfaces faces a mounting surface on which the multilayer ceramic electronic component is mounted and that the first and second inner electrode layers are perpendicular or substantially perpendicular to the mounting surface. A distance between an end of the first outer electrode on the one of the first and second side surfaces and an end of the second outer electrode on the one of the first and second side surfaces is in a range from about 1.8% to about 31.3% of a length dimension l of the multilayer ceramic electronic component body in a direction connecting the first and second end surfaces of the multilayer ceramic electronic component body.

Preferred embodiments of the present invention provide small surface-mountable multilayer ceramic electronic components with each of which creeping discharge and heat generation are able to be reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. Multilayer Ceramic Electronic Component

First Preferred Embodiment

Figure 1:
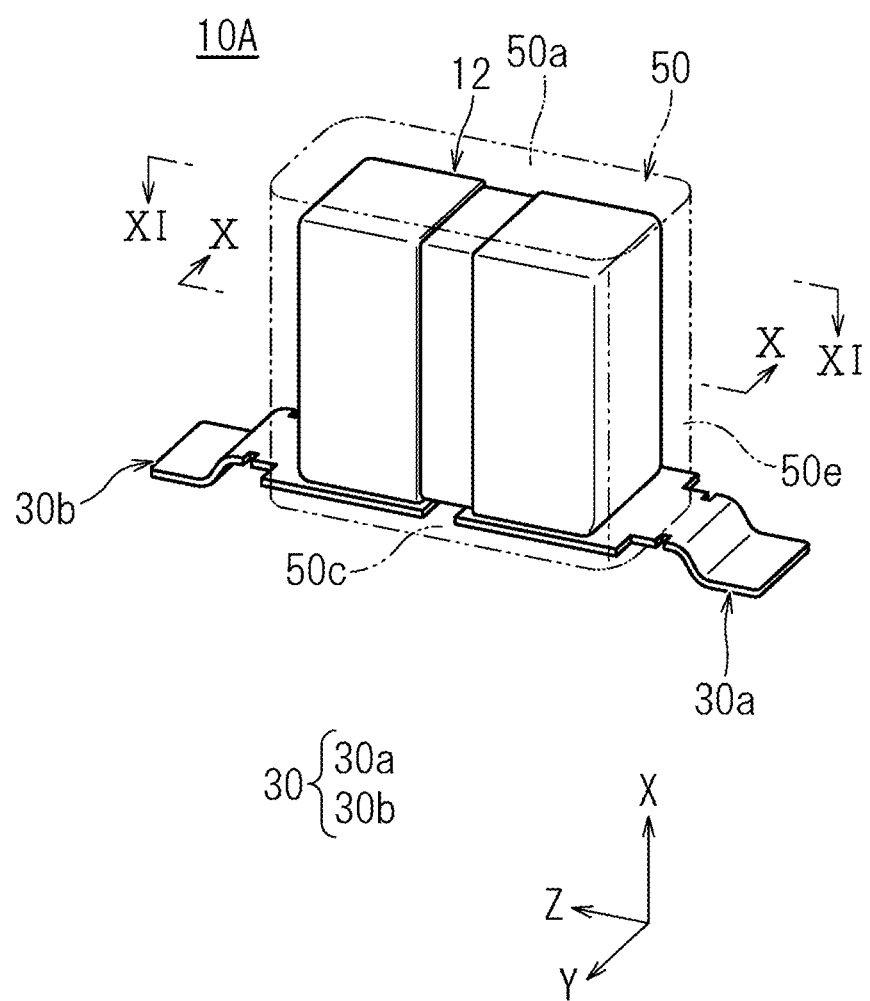
FIG. 1 is an external perspective view of an example of a multilayer ceramic electronic component according to a first preferred embodiment of the present invention.
Figure 2:
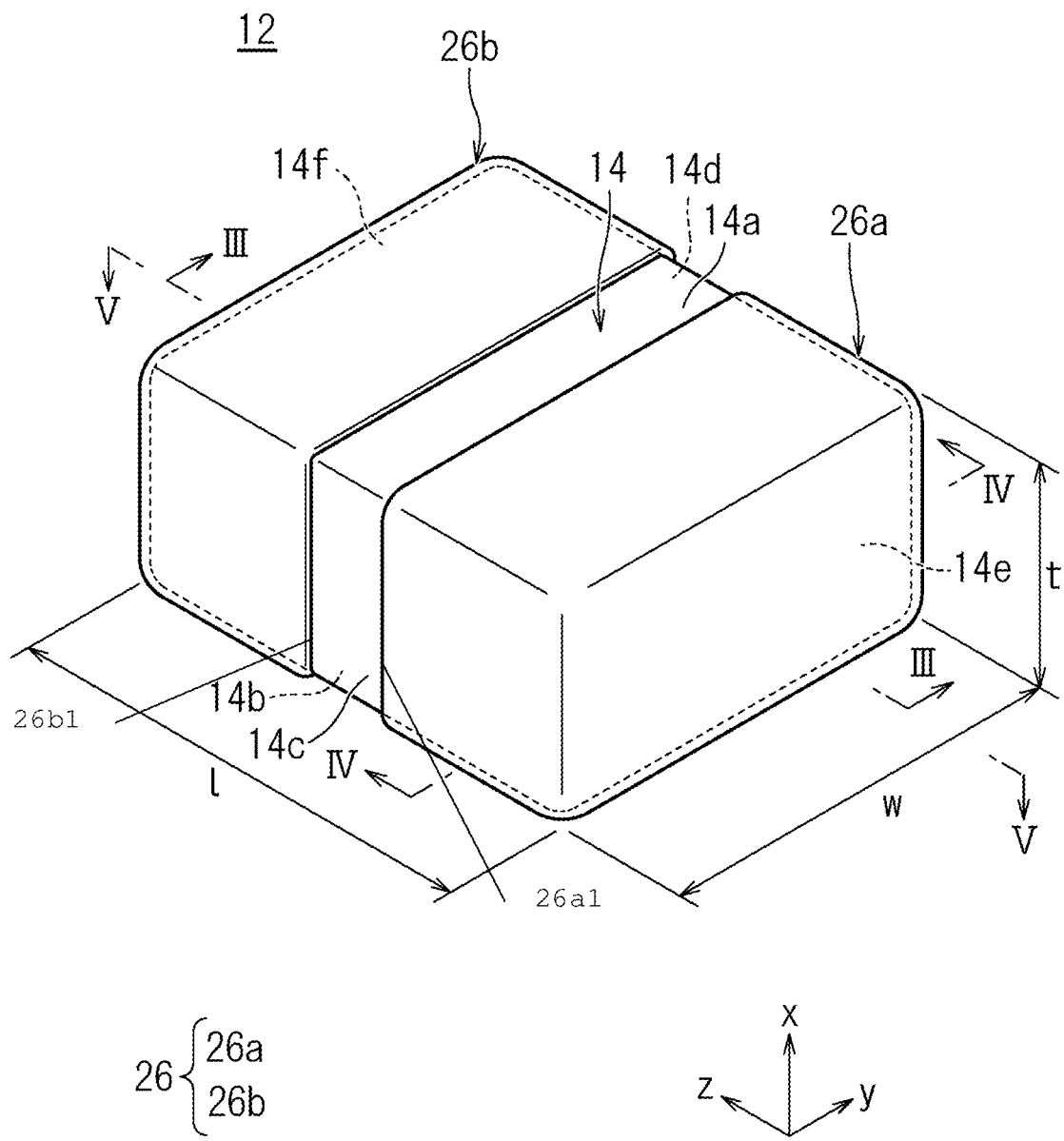
FIG. 2 is a perspective view illustrating the external shape of a multilayer ceramic electronic component body included in the multilayer ceramic electronic component illustrated in FIG. 1.
Figure 3:
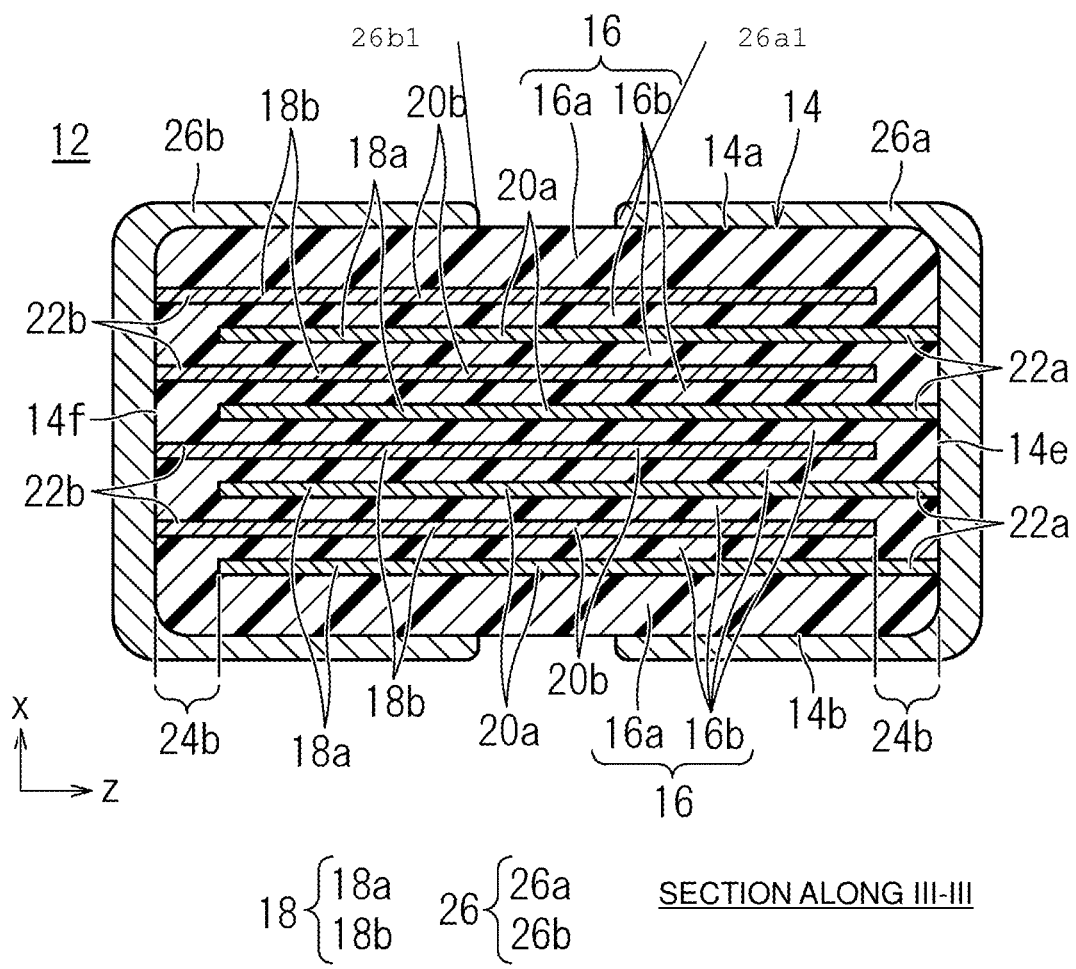
FIG. 3 is a sectional view of the multilayer ceramic electronic component body illustrated in FIG. 2 taken along line III-III.
Figure 4:
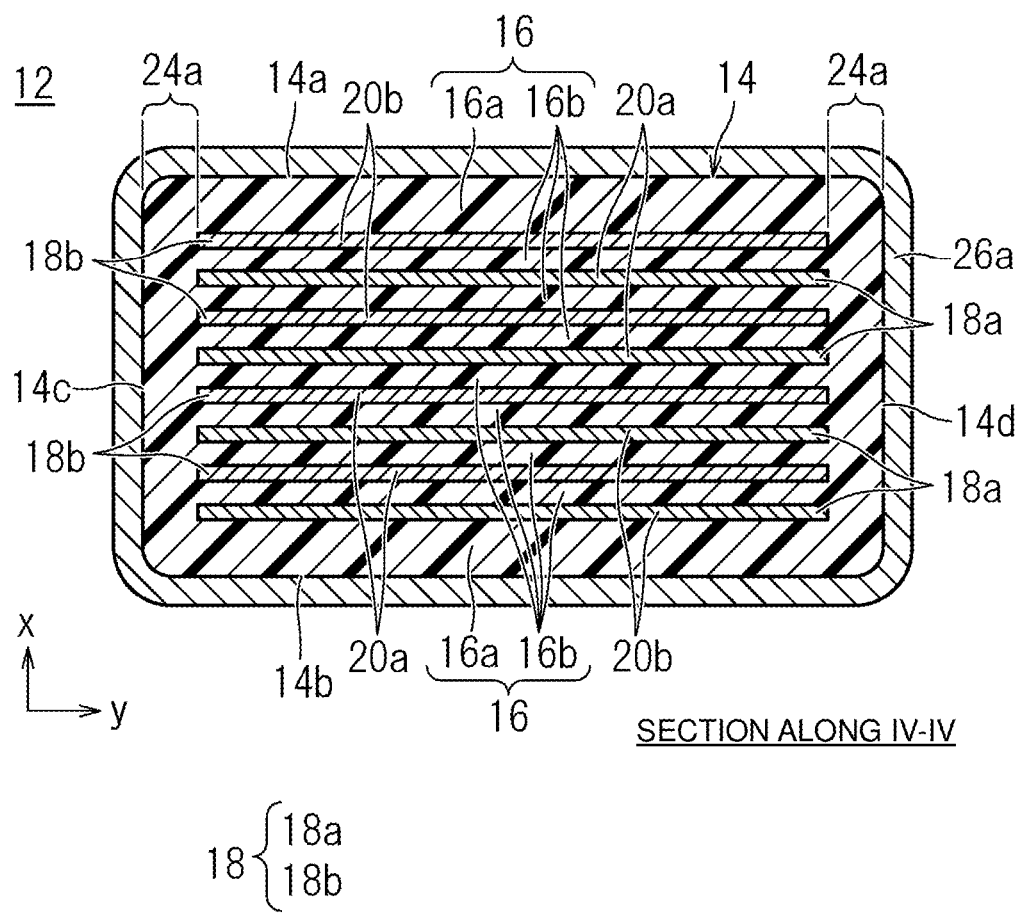
FIG. 4 is a sectional view of the multilayer ceramic electronic component body illustrated in FIG. 2 taken along line IV-IV.
Figure 5:
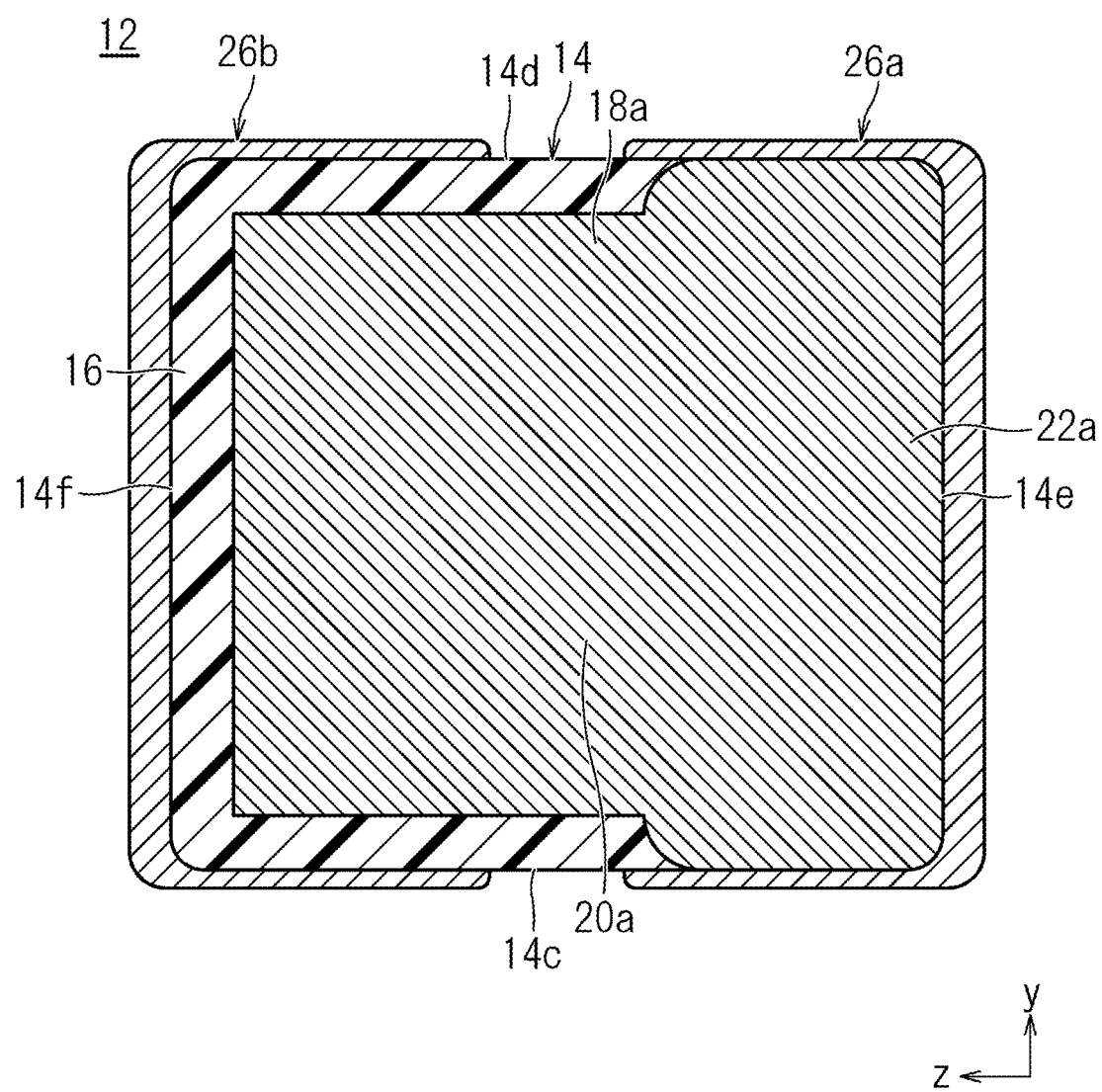
FIG. 5 is a sectional view of the multilayer ceramic electronic component body illustrated in FIG. 2 taken along line V-V.
Figure 6:
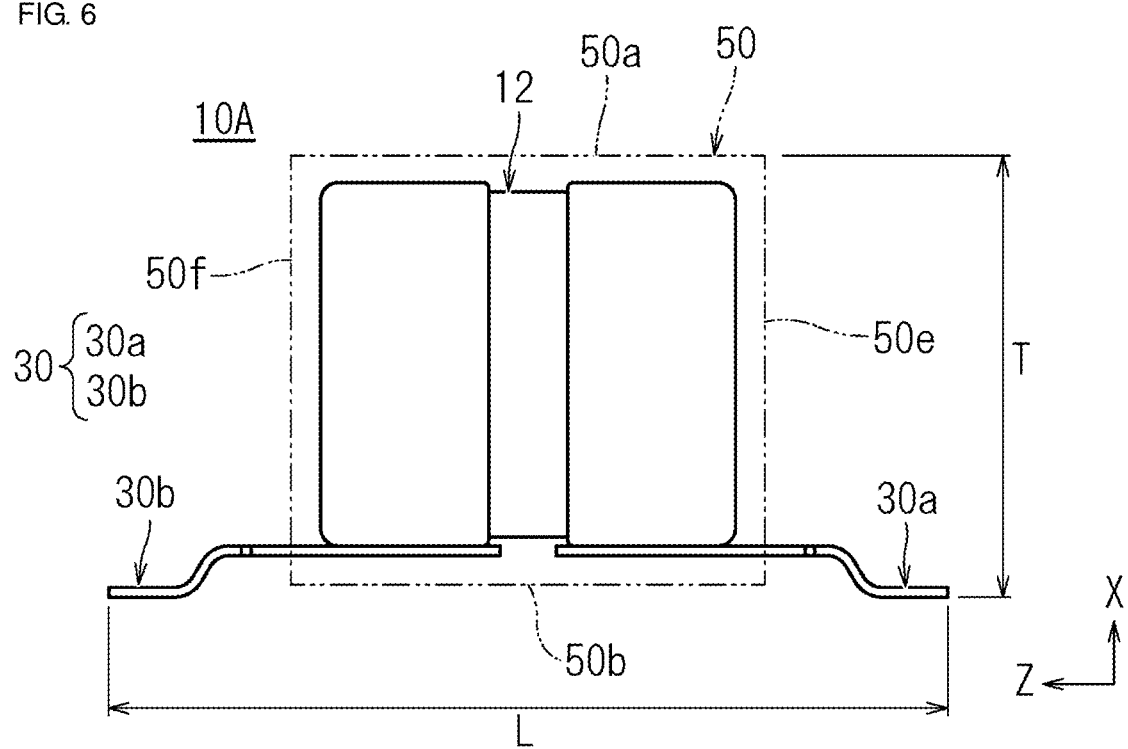
FIG. 6 is a front view of the multilayer ceramic electronic component illustrated in FIG. 1.
Figure 7:
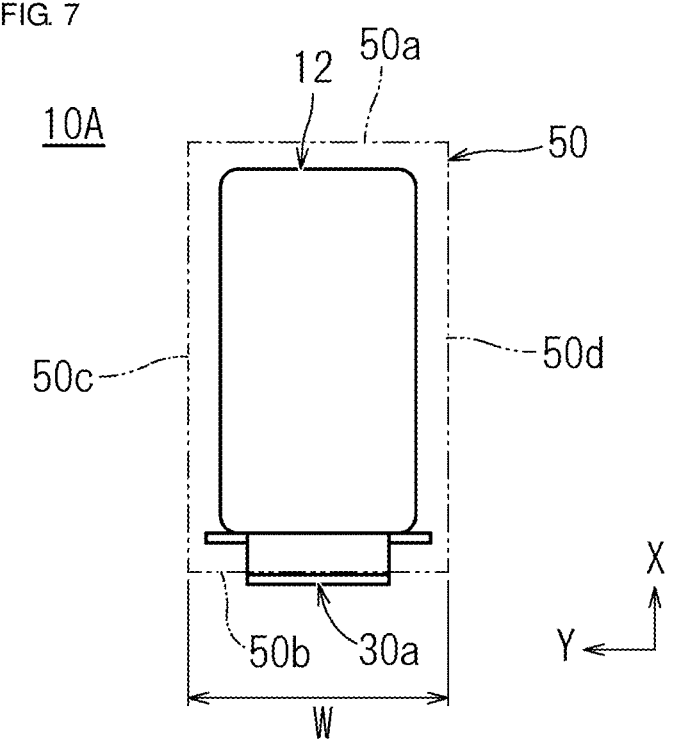
FIG. 7 is a side view of the multilayer ceramic electronic component illustrated in FIG. 1.
Figure 8:
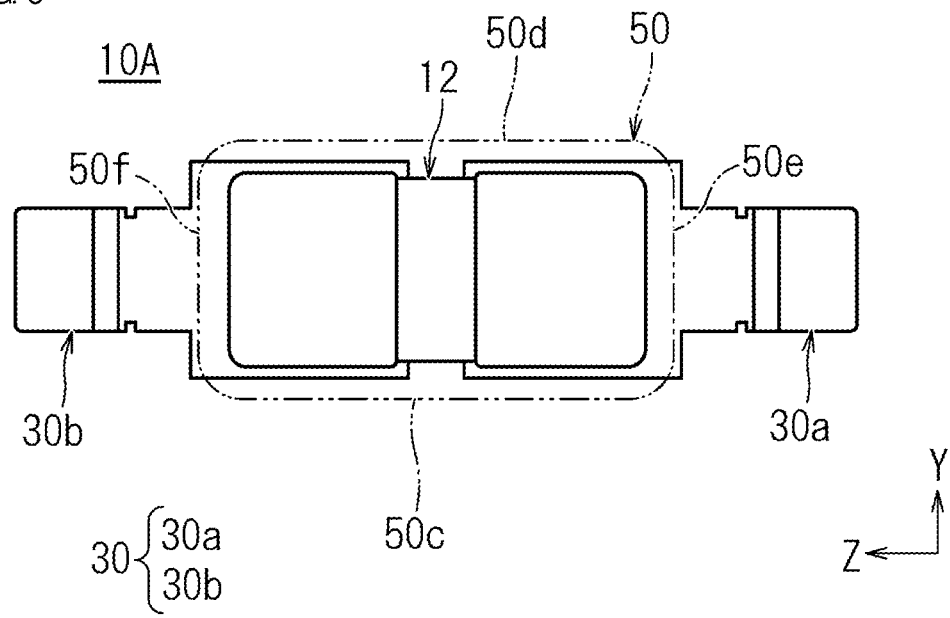
FIG. 8 is a bottom view of the multilayer ceramic electronic component illustrated in FIG. 1.
Figure 9:
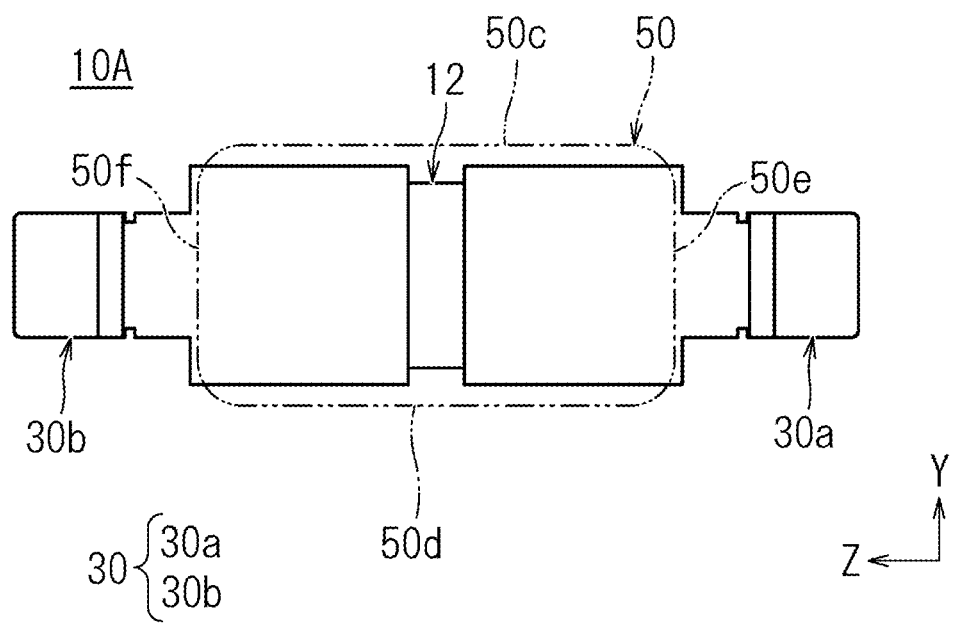
FIG. 9 is a top view of the multilayer ceramic electronic component illustrated in FIG. 1.
Figure 10:
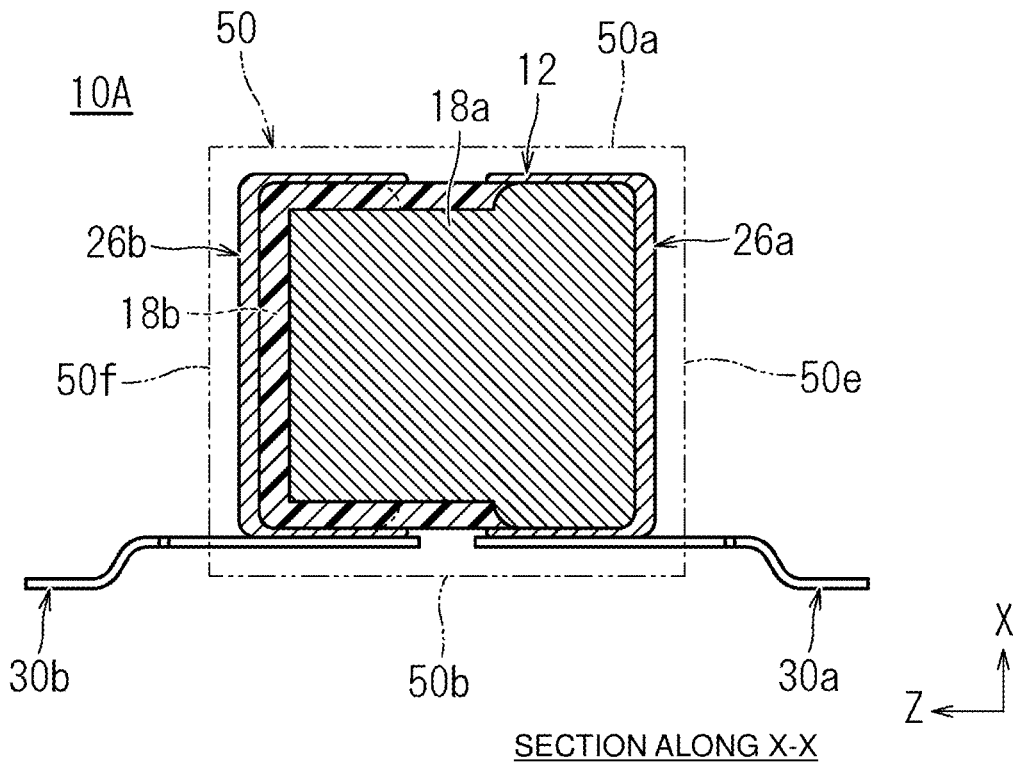
FIG. 10 is a sectional view of the multilayer ceramic electronic component illustrated in FIG. 1 taken along line X-X.
Figure 11:
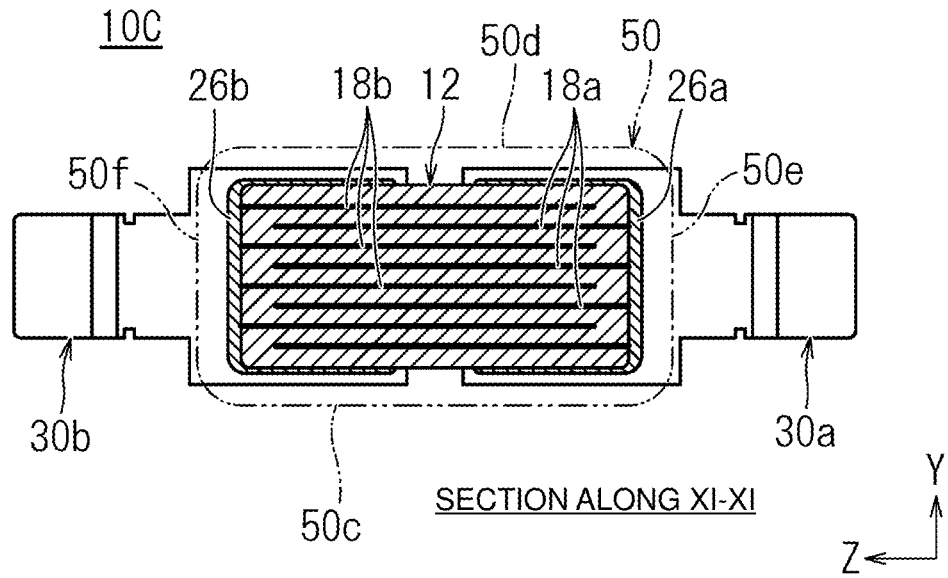
FIG. 11 is a sectional view of the multilayer ceramic electronic component illustrated in FIG. 1 taken along line XI-XI.
Figure 12:
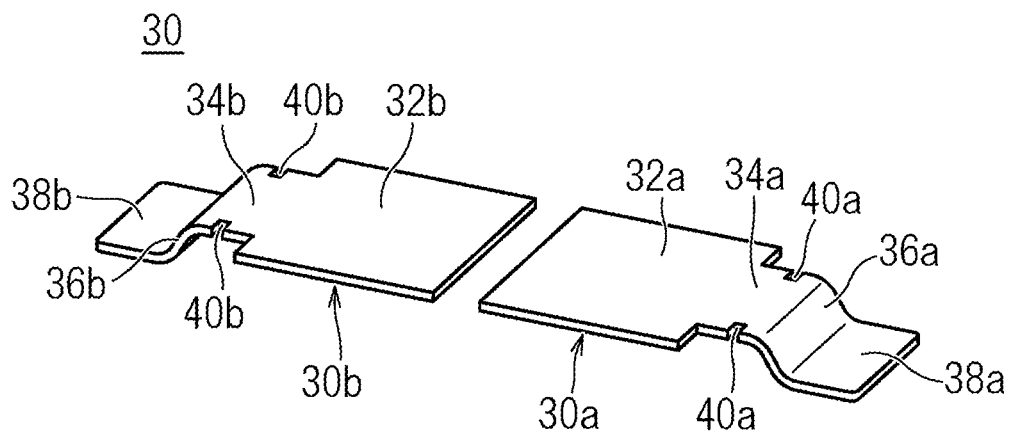
FIG. 12 is an external perspective view of metal terminals included in the multilayer ceramic electronic component according to the first preferred embodiment of the present invention.

A multilayer ceramic electronic component according to a first preferred embodiment of the present invention will now be described. FIG. 1 is an external perspective view of an example of a multilayer ceramic electronic component according to a first preferred embodiment of the present invention. FIG. 2 is a perspective view illustrating the external shape of a multilayer ceramic electronic component body included in the multilayer ceramic electronic component illustrated in FIG. 1. FIG. 3 is a sectional view of the multilayer ceramic electronic component body illustrated in FIG. 2 taken along line III-III. FIG. 4 is a sectional view of the multilayer ceramic electronic component body illustrated in FIG. 2 taken along line IV-IV. FIG. 5 is a sectional view of the multilayer ceramic electronic component body illustrated in FIG. 2 taken along line V-V. FIG. 6 is a front view of the multilayer ceramic electronic component illustrated in FIG. 1. FIG. 7 is a side view of the multilayer ceramic electronic component illustrated in FIG. 1. FIG. 8 is a bottom view of the multilayer ceramic electronic component illustrated in FIG. 1. FIG. 9 is a top view of the multilayer ceramic electronic component illustrated in FIG. 1. FIG. 10 is a sectional view of the multilayer ceramic electronic component illustrated in FIG. 1 taken along line X-X. FIG. 11 is a sectional view of the multilayer ceramic electronic component illustrated in FIG. 1 taken along line XI-XI. FIG. 12 is an external perspective view of metal terminals included in the multilayer ceramic electronic component according to the first preferred embodiment of the present invention.

(1) Multilayer Ceramic Electronic Component Body

A multilayer ceramic electronic component 10A according to the first preferred embodiment includes a multilayer ceramic electronic component body 12. The multilayer ceramic electronic component body 12 includes a rectangular or substantially rectangular-parallelepiped-shaped multilayer body 14 and outer electrodes 26. The multilayer ceramic electronic component 10A also includes metal terminals 30 connected to the outer electrodes 26 of the multilayer ceramic electronic component body 12 and a cover material 50 that covers the multilayer body 14, the outer electrodes 26, and portions of the metal terminals 30.

The multilayer body 14 includes a plurality of ceramic layers 16 and a plurality of inner electrode layers 18 that are laminated together. The multilayer body 14 includes a first principal surface 14a and a second principal surface 14b that are opposite to each other in a lamination direction x; a first side surface 14c and a second side surface 14d that are opposite to each other in a width direction y that is orthogonal or substantially orthogonal to the lamination direction x;

and a first end surface 14e and a second end surface 14f that are opposite to each other in a length direction z that is orthogonal or substantially orthogonal to the lamination direction x and the width direction y. The multilayer body 14 preferably includes rounded corner portions and rounded ridge portions.

The corner portions are portions at which three adjacent surfaces of the multilayer body 14 intersect. The ridge portions are portions at which two adjacent surfaces of the multilayer body 14 intersect. The first and second principal surfaces 14a and 14b, the first and second side surface 14c and 14d, and the first and second end surfaces 14e and 14f may each have irregularities over a partial area or the entire area thereof.

The dimension of the multilayer ceramic electronic component body 12 including the multilayer body 14 and the outer electrodes 26 in the length direction z is defined as dimension l. The dimension of the multilayer ceramic electronic component body 12 including the multilayer body 14 and the outer electrodes 26 in the lamination direction x is defined as dimension t. The dimension of the multilayer ceramic electronic component body 12 including the multilayer body 14 and the outer electrodes 26 in the width direction y is defined as dimension w.

The first side surface 14c or the second side surface 14d of the multilayer ceramic electronic component body 12 is parallel or substantially parallel to a surface (mounting surface) on which the multilayer ceramic electronic component 10A is mounted.

The multilayer body 14 includes outer layer portions 16a which each include two or more of the ceramic layers 16 and an inner layer portion 16b including one or more of the ceramic layers 16 and the inner electrode layers 18 provided on the ceramic layers 16. The outer layer portions 16a are adjacent to the first and second principal surfaces 14a and 14b of the multilayer body 14, and are collections of the ceramic layers 16 disposed between the first principal surface 14a and the inner electrode layer 18 closest to the first principal surface 14a and the ceramic layers 16 disposed between the second principal surface 14b and the inner electrode layer 18 closest to the second principal surface 14b. The inner layer portion 16b is the region between the outer layer portions 16a.

The ceramic layers 16 may preferably be made of, for example, a dielectric material. The dielectric material may preferably be a dielectric ceramic containing, for example, $BaTiO_3$, $CaTiO_3$, $SrTiO_3$, or $CaZrO_3$. When the dielectric material is a main component, a sub-component, such as a Mn compound, a Fe compound, a Cr compound, a Co compound, or a Ni compound, may be added in accordance with the desired characteristics of the multilayer body 14. The content of the sub-component is less than that of the main component.

When the multilayer body 14 contains a piezoelectric ceramic material, the multilayer ceramic electronic component body 12 defines and functions as a ceramic piezoelectric element. The piezoelectric ceramic material may preferably be, for example, a lead zirconate titanate (PZT)-based ceramic material.

When the multilayer body 14 contains a semiconductor ceramic material, the multilayer ceramic electronic component body defines and functions as a thermistor element. The semiconductor ceramic material may preferably be, for example, a spinel-based ceramic material.

When the multilayer body 14 contains a magnetic ceramic material, the multilayer ceramic electronic component body 12 defines and functions as an inductor element. When the multilayer ceramic electronic component body 12 defines and functions as an inductor element, the inner electrode layers 18 define a coil-shaped conductor. The magnetic ceramic material may preferably be, for example, a ferrite ceramic material.

The thickness of the ceramic layers 16 after a baking process is preferably in the range from about 0.5 μm to about 10.0 μm, for example.

The inner electrode layers 18 of the multilayer body 14 include a plurality of first inner electrode layers 18a and a plurality of second inner electrode layers 18b. The first inner electrode layers 18a and the second inner electrode layers 18b are embedded in the multilayer body 14, and are alternately arranged at equal or substantially equal intervals in the lamination direction x of the multilayer body 14.

Each first inner electrode layer 18a includes a first facing electrode portion 20a that faces a corresponding one of the second inner electrode layers 18b and a first extended electrode portion 22a that is provided at one end of the first inner electrode layer 18a and extends from the first facing electrode portion 20a to the first end surface 14e, a portion of the first side surface 14c, and a portion of the second side surface 14d of the multilayer body 14. The first extended electrode portion 22a includes an end portion that extends to and is exposed at the first end surface 14e, a portion of the first side surface 14c, and a portion of the second side surface 14d. The first extended electrode portion 22a may have any shape as long as the first extended electrode portion 22a extends to the first end surface 14e, a portion of the first side surface 14c, and a portion of the second side surface 14d. In the present preferred embodiment of the present invention, as illustrated in FIG. 5, the first extended electrode portion 22a is preferably substantially T-shaped, for example. Thus, the contact area between the first extended electrode portion 22a and a corresponding one of the outer electrodes 26 is large, and the ESR and $R_\theta$ (thermal resistance) are able to be reduced.

Each second inner electrode layer 18b includes a second facing electrode portion 20b that faces a corresponding one of the first inner electrode layers 18a and a second extended electrode portion 22b that is provided at one end of the second inner electrode layer 18b and extends from the second facing electrode portion 20b to the second end surface 14f, a portion of the first side surface 14c, and a portion of the second side surface 14d of the multilayer body 14. The second extended electrode portion 22b includes an end portion that extends to and is exposed at the second end surface 14f, a portion of the first side surface 14c, and a portion of the second side surface 14d. The second extended electrode portion 22b may have any shape as long as the second extended electrode portion 22b extends to the second end surface 14f, a portion of the first side surface 14c, and a portion of the second side surface 14d. In the present preferred embodiment of the present invention, as illustrated in FIG. 5, the second extended electrode portion 22b is preferably substantially T-shaped, for example. Thus, the contact area between the second extended electrode portion 22b and a corresponding one of the outer electrodes 26 is large, and the ESR and $R_\theta$ (thermal resistance) are able to be reduced.

The first inner electrode layers 18a and the second inner electrode layers 18b extend perpendicular or substantially perpendicular to the mounting surface. Accordingly, all of the exposed portions of the first inner electrode layers 18a and the second inner electrode layers 18b are closest to and at equal or substantially equal distances from the outer electrodes 26 and the metal terminals 30. Accordingly, the ESR and thermal resistance are able to be reduced.

The multilayer body 14 includes side portions (W gaps) 24a between the first side surface 14c and one end of each of the first facing electrode portions 20a and the second facing electrode portions 20b in the width direction y and between the second side surface 14d and the other end of each of the first facing electrode portions 20a and the second facing electrode portions 20b in the width direction y. The multilayer body 14 also includes end portions (L gaps) 24b between the second end surface 14f and an end portion of each first inner electrode layer 18a that is opposite to the first extended electrode portion 22a and between the first end surface 14e and an end portion of each second inner electrode layer 18b that is opposite to the second extended electrode portion 22b.

The inner electrode layers 18 contain an appropriate conductive material, for example, a metal such as Ni, Cu, Ag, Pd, or Au, or an alloy containing at least one of these metals, such as an Ag—Pd alloy. The inner electrode layers 18 may also contain dielectric particles having the same composition system as that of the ceramic contained in the ceramic layers 16.

The thickness of the inner electrode layers 18 is preferably in the range from about 0.1 μm to about 2.0 μm, for example.

The outer electrodes 26 are provided on the first end surface 14e and the second end surface 14f of the multilayer body 14. The outer electrodes 26 include a first outer electrode 26a and a second outer electrode 26b.

The first outer electrode 26a is disposed on the first end surface 14e of the multilayer body 14, and extends from the first end surface 14e to partially cover the first principal surface 14a, the second principal surface 14b, the first side surface 14c, and the second side surface 14d. The first outer electrode 26a is electrically connected to the first extended electrode portions 22a of the first inner electrode layers 18a.

The second outer electrode 26b is disposed on the second end surface 14f of the multilayer body 14, and extends from the second end surface 14f to partially cover the first principal surface 14a, the second principal surface 14b, the first side surface 14c, and the second side surface 14d. The second outer electrode 26b is electrically connected to the second extended electrode portions 22b of the second inner electrode layers 18b.

As shown in FIGS. 2 and 3, the distance between an end 26a1 of the first outer electrode 26a on the first or second side surface 14c or 14d and an end 26b1 of the second outer electrode 26b on the first or second side surface 14c or 14d is preferably in the range from, for example, about 1.8% to about 31.3% of dimension l of the multilayer ceramic electronic component body 12 in the direction connecting the first end surface 14e and the second end surface 14f of the multilayer ceramic electronic component body 12. By making the dimension e of the outer electrodes 26 as large as possible, the contact area between the outer electrodes 26 and the inner electrode layers 18 is able to be increased and the effect of reducing the ESR and $R_\theta$ (thermal resistance) is able to be increased or maximized. When the above-described distance is in the range from about 3.1% to about 31.3% of the dimension l, the ESR and $R_\theta$ (thermal resistance) are able to be more reliably reduced.

The first facing electrode portions 20a of the first inner electrode layers 18a and the second facing electrode portions 20b of the second inner electrode layers 18b face each other with the ceramic layers 16 interposed therebetween in the multilayer body 14 to provide an electrostatic capacitance. Accordingly, an electrostatic capacitance is provided between the first outer electrode 26a connected to the first inner electrode layers 18a and the second outer electrode 26b connected to the second inner electrode layers 18b, and the characteristics of a capacitor are obtained.

Each outer electrode 26 includes an underlying electrode layer and a plating layer arranged in that order from the multilayer body 14. The underlying electrode layer preferably includes at least one of a baked layer, a resin layer, and a thin film layer, for example.

An example in which the underlying electrode layer includes a baked layer will now be described.

The baked layer contains glass and metal. The metal contained in the baked layer preferably includes, for example, at least one of Cu, Ni, Ag, Pd, an Ag—Pd alloy, and Au. The glass contained in the baked layer preferably includes, for example, at least one of B, Si, Ba, Mg, Al, and Li. A ceramic material of the same type as the material of the ceramic layers 16 may be used instead of the glass. The baked layer may include a plurality of layers. The baked layer is formed by applying conductive paste containing the glass and the metal to the multilayer body 14 and baking the conductive paste. The conductive paste may be baked together with the ceramic layers 16 and the inner electrode layers or may be baked after the ceramic layers 16 and the inner electrode layers 18. In the case in which the conductive paste is baked together with the inner electrode layers 18, a ceramic material of the same type as the material of the ceramic layers 16 is preferably used, instead of the glass.

The thickness (maximum thickness) of the baked layer is preferably in the range from about 10 μm to about 50 μm, for example.

The thickness of the baked layer in the underlying electrode layer on each of the first and second end surfaces 14e and 14f is preferably in the range from about 10 μm to about 30 μm, for example, at the center thereof in the height direction.

When the underlying electrode layer is formed on the first and second principal surfaces 14a and 14b and the first and second side surfaces 14c and 14d, the thickness of the baked layer in the underlying electrode layer on each of the first and second principal surfaces 14a and 14b and the first and second side surfaces 14c and 14d is preferably in the range from about 30 μm to about 50 μm, for example, at the center thereof in the length direction z.

An example in which the underlying electrode layer includes of a resin layer will now be described.

The resin layer may be provided on the surface of the baked layer or directly on the first end surface 14e or the second end surface 14f of the multilayer body 14 without the baked layer. The resin layer contains conductive particles and a thermosetting resin. The resin layer may include a plurality of layers.

The thickness (maximum thickness) of the resin layer is preferably in the range from about 10 μm to about 150 μm, for example.

The thickness of the resin layer on each of the first and second end surfaces 14e and 14f is preferably in the range from, for example, about 10 μm to about 30 μm at the center thereof in the height direction.

When the resin layer is provided on the first and second principal surfaces 14a and 14b and the first and second side surfaces 14c and 14d, the thickness of the resin layer on each of the first and second principal surfaces 14a and 14b and the first and second side surfaces 14c and 14d is preferably in the range from, for example, about 30 μm to about 50 μm at the center thereof in the length direction z.

When the underlying electrode layer is a thin film layer, the thin film layer is formed by a thin film forming method, such as sputtering or vapor deposition, for example, and includes a layer formed by depositing metal particles to a thickness of about 1 μm or less, for example.

The plating layer covers the underlying electrode layer. The plating layer preferably contains, for example, at least one of Cu, Ni, Sn, Ag, Pd, an Ag—Pd alloy, and Au. The plating layer may include a plurality of layers. In such a case, the plating layer preferably has a two-layer structure including a Ni plating layer and a Sn plating layer, for example. In the case in which the Ni plating layer is provided to cover the surface of the underlying electrode layer, the underlying electrode layer is able to be prevented from being eroded by solder when the multilayer ceramic electronic component body 12 is soldered to the metal terminals 30. In the case in which the Sn plating layer is provided on the surface of the Ni plating layer, solder wettability is able to be increased when the multilayer ceramic electronic component body 12 is soldered to the metal terminals 30, so that the mounting process is able to be facilitated.

The thickness of each layer of the plating layer is preferably in the range from about 1 μm to about 15 μm, for example.

The thickness of the plating layer on the first and second end surfaces 14e and 14f is preferably in the range from, for example, about 1 μm to about 15 μm at the center thereof in the height direction.

When the plating layer is provided on the first and second principal surfaces 14a and 14b and the first and second side surfaces 14c and 14d, the thickness of the plating layer on each of the first and second principal surfaces 14a and 14b and the first and second side surfaces 14c and 14d is preferably in the range, for example, from about 1 μm to about 15 μm at the center thereof in the length direction z.

The underlying electrode layer may be omitted, and each outer electrode 26 may include only the plating layer. A structure in which the underlying electrode layer is not provided and the plating layer is provided will now be described.

Each of the first outer electrode 26a and the second outer electrode 26b may include no underlying electrode layer and a plating layer provided directly on the surface of the multilayer body 14. In other words, the multilayer ceramic electronic component body 12 may include plating layers that are electrically connected to the first inner electrode layers 18a or the second inner electrode layers 18b. In this case, the plating layers may be formed after applying catalyst to the surfaces of the multilayer body 14 as a pretreatment.

Each plating layer preferably includes a lower plating electrode provided on the surface of the multilayer body 14 and an upper plating electrode provided on the surface of the lower plating electrode.

Each of the lower plating electrode and the upper plating electrode preferably includes, for example, at least one metal selected from Cu, Ni, Sn, Pb, Au, Ag, Pd, Bi, and Zn or an alloy containing the metal.

The lower plating electrode is preferably made of Ni, for example, which defines and functions as a solder barrier, and the upper plating electrode is preferably made of Sn or Au, which have high solder wettability. When, for example, the first inner electrode layers 18a and the second inner electrode layers 18b are made of Ni, the lower plating electrode is preferably made of Cu, which is easily bondable to Ni. The upper plating electrode may be provided as necessary, and each of the first outer electrode 26a and the second outer electrode 26b may include only the lower plating electrode.

The upper plating electrode of the plating layer may be the outermost layer. Alternatively, another plating electrode may be additionally provided on the surface of the upper plating electrode.

When no underlying electrode layer is provided, the thickness of each layer of the plating layer is preferably in the range from about 1 μm to about 15 μm, for example. The plating layer preferably contains no glass, and the content of metal per unit volume of the plating layer is preferably greater than or equal to about 99 vol %, for example.

The direction in which the metal terminals 30 of the multilayer ceramic electronic component 10A extend (in other words, the direction connecting the first end surface 14e and the second end surface 14f of the multilayer ceramic electronic component body 12) is defined as a length direction Z of the multilayer ceramic electronic component 10A. The direction connecting the first principal surface 14a and the second principal surface 14b of the multilayer ceramic electronic component body 12 is defined as a width direction Y of the multilayer ceramic electronic component 10A. The direction connecting the first side surface 14c and the second side surface 14d of the multilayer ceramic electronic component body 12 is defined as a height direction X of the multilayer ceramic electronic component 10A.

The cover material 50, which will be described in detail below, includes a first principal surface 50a and a second principal surface 50b that are respectively adjacent to the first side surface 14c and the second side surface 14d of the multilayer ceramic electronic component body 12; a first side surface 50c and a second side surface 50d that are respectively adjacent to the first principal surface 14a and the second principal surface 14b of the multilayer ceramic electronic component body 12; and a first end surface 50e and a second end surface 50f that are respectively adjacent to the first end surface 14e and the second end surface 14f of the multilayer ceramic electronic component body 12.

(2) Metal Terminals

The metal terminals 30 are connected to the outer electrodes 26 on both end surfaces of the multilayer ceramic electronic component body 12.

The metal terminals 30 include a first metal terminal 30a and a second metal terminal 30b.

The first metal terminal 30a is connected to the first outer electrode 26a of the multilayer ceramic electronic component body 12 by a joining material. More specifically, the first metal terminal 30a is connected to the first outer electrode 26a on the first or second side surface 14c or 14d of the multilayer ceramic electronic component body 12.

The second metal terminal 30b is connected to the second outer electrode 26b of the multilayer ceramic electronic component body 12 by a joining material. More specifically, the second metal terminal 30b is connected to the second outer electrode 26b on the first or second side surface 14c or 14d of the multilayer ceramic electronic component body 12.

The metal terminals 30 enable surface mounting of the multilayer ceramic electronic component body 12 to a mounting board. The metal terminals 30 may preferably be, for example, plate-shaped lead frames. Each of the metal terminals 30 defined by plate-shaped lead frames includes a first principal surface that is connected to a corresponding one of the outer electrodes 26, a second principal surface that is opposite to the first principal surface (that faces away from the multilayer ceramic electronic component body 12), and a surrounding surface that defines the thickness between the first principal surface and the second principal surface.

The first metal terminal 30a includes a first terminal joining portion 32a that is connected to the first outer electrode 26a; a first extending portion 34a that is connected to the first terminal joining portion 32a and extends in a direction parallel or substantially parallel to the first side surface 14c (side surface facing the mounting surface) so as to be spaced apart from the first side surface 14c (side surface facing the mounting surface) and the mounting surface; a second extending portion 36a that is connected to the first extending portion 34a and extends toward the mounting surface positioned opposite the multilayer ceramic electronic component body 12; and a first mounting portion 38a that is connected to the second extending portion 36a and mounted on the mounting board. The structure of the extending portions is not limited to the above-described structure, and a curved extending portion may be additionally provided.

The second metal terminal 30b includes a second terminal joining portion 32b that is connected to the second outer electrode 26b; a third extending portion 34b that is connected to the second terminal joining portion 32b and extends in a direction parallel or substantially parallel to the first side surface 14c (side surface facing the mounting surface) so as to be spaced apart from the first side surface 14c (side surface facing the mounting surface) and the mounting surface; a fourth extending portion 36b that is connected to the third extending portion 34b and extends toward the mounting surface positioned opposite the multilayer ceramic electronic component body 12; and a second mounting portion 38b that is connected to the fourth extending portion 36b and mounted on the mounting board. The structure of the extending portions is not limited to the above-described structure, and a curved extending portion may be additionally provided.

(a) First Terminal Joining Portion and Second Terminal Joining Portion

The first terminal joining portion 32a of the first metal terminal 30a is joined to the first outer electrode 26a on the first side surface 14c (side surface facing the mounting surface) of the multilayer ceramic electronic component body 12. The first terminal joining portion 32a may be connected in any manner as long as the first terminal joining portion 32a corresponds to the first outer electrode 26a on the multilayer ceramic electronic component body 12, but is preferably connected so as to cover the first outer electrode 26a on the first side surface 14c (surface facing the mounting surface) over the entire or substantially the entire area thereof. In other words, the first terminal joining portion 32a of the first metal terminal 30a preferably has a length corresponding to that of the first outer electrode 26a on the first or second side surface 14c or 14d. Accordingly, the contact area between the outer electrodes 26 and the metal terminals 30 including the joining material provided therebetween is increased, and $R_\theta$ (thermal resistance) is able to be further reduced.

The second terminal joining portion 32b of the second metal terminal 30b is joined to the second outer electrode 26b on the first side surface 14c (side surface facing the mounting surface) of the multilayer ceramic electronic component body 12. The second terminal joining portion 32b may be connected in any manner as long as the second terminal joining portion 32b corresponds to the second outer electrode 26b on the multilayer ceramic electronic component body 12, but is preferably connected so as to cover the second outer electrode 26b on the first side surface 14c (surface facing the mounting surface) over the entire or substantially the entire area thereof. In other words, the second terminal joining portion 32b of the second metal terminal 30b preferably has a length corresponding to that of the second outer electrode 26b on the first or second side surface 14c or 14d. Accordingly, the contact area between the outer electrodes 26 and the metal terminals 30 including the joining material provided therebetween is increased, and $R_\theta$ (thermal resistance) is able to be further reduced.

(b) First Extending Portion and Third Extending Portion

The first extending portion 34a of the first metal terminal 30a is connected to the first terminal joining portion 32a and extends away from the multilayer ceramic electronic component body 12 in a direction parallel or substantially parallel to the first or second side surface 14c or 14d (side surface facing the mounting surface). Accordingly, the length of a portion molded by the cover material 50 is able to be increased. As a result, a sufficient insulating surface distance (creeping distance) is able to be provided between the conductors. In addition, a sufficient bending margin is able to be provided when the terminal is bent.

The length of the first extending portion 34a of the first metal terminal 30a in the length direction Z of the multilayer ceramic electronic component 10A is preferably shorter than the length of the first terminal joining portion 32a in the length direction Z of the multilayer ceramic electronic component 10A. More specifically, the length of the first extending portion 34a is preferably in the range from, for example, about 50% to about 90% of the length of the first terminal joining portion 32a in the length direction Z of the multilayer ceramic electronic component 10A. Accordingly, a resin inlet used to form the cover material 50 by molding may be provided in a lower section, and the resin fluidity is able to be improved or optimized. In addition, the amount of material of the metal terminals is able to be reduced, so that the cost is able to be reduced. The length of the first extending portion 34a of the first metal terminal 30a in the width direction Y of the multilayer ceramic electronic component 10A may be equal or substantially equal to that of the first terminal joining portion 32a, or be reduced stepwise or in a tapered shape.

The first extending portion 34a may include a portion whose surface is processed into a recessed shape so that the base material of the first metal terminal 30a is exposed at the processed portion. Accordingly, even if the joining material in the joined section is melted, solder leakage is able to be prevented because the wettability for the joining material is reduced at the processed portion having a recessed shape at which the base material of the first metal terminal 30a is exposed. Thus, the melted joining material does not easily flow out of the cover material 50.

The first extending portion 34a may also include a cut portion. In such a case, the amount of material of the metal terminals is able to be reduced, so that the cost is able to be reduced. In addition, the stress applied by the mounting board after the mounting process is able to be reduced.

The third extending portion 34b of the second metal terminal 30b is connected to the second terminal joining portion 32b and extends away from the multilayer ceramic electronic component body 12 in a direction parallel or substantially parallel to the first or second side surface 14c or 14d (side surface facing the mounting surface). Accordingly, the length of the portion molded by the cover material 50 is able to be increased. As a result, a sufficient insulating surface distance (creeping distance) is able to be provided between the conductors. In addition, a sufficient bending margin is able to be provided when the terminal is bent.

The length of the third extending portion 34b of the second metal terminal 30b in the length direction Z of the multilayer ceramic electronic component 10A is preferably shorter than the length of the second terminal joining portion 32b in the length direction Z of the multilayer ceramic electronic component 10A. More specifically, the length of the third extending portion 34b is preferably in the range from, for example, about 50% to about 90% of the length of the second terminal joining portion 32b in the length direction Z of the multilayer ceramic electronic component 10A. Accordingly, a resin inlet used to form the cover material 50 by molding may be provided in a lower section, and the resin fluidity is able to be improved or optimized. In addition, the amount of material of the metal terminals is able to be reduced, so that the cost is able to be reduced. The length of the third extending portion 34b of the second metal terminal 30b in the width direction Y of the multilayer ceramic electronic component 10A may be equal or substantially equal to that of the first terminal joining portion 32a, or be reduced stepwise or in a tapered shape.

The third extending portion 34b may include a portion whose surface is processed into a recessed shape so that the base material of the second metal terminal 30b is exposed at the processed portion. Accordingly, even if the joining material in the joined section is melted, solder leakage is able to be prevented because the wettability for the joining material is reduced at the processed portion having a recessed shape at which the base material of the second metal terminal 30b is exposed. Thus, the melted joining material does not easily flow out of the cover material 50.

The third extending portion 34b may also include a cut portion. In such a case, the amount of material of the metal terminals is able to be reduced, so that the cost is able to be reduced. In addition, the stress applied by the mounting board after the mounting process is able to be reduced.

(c) Second Extending Portion and Fourth Extending Portion

The second extending portion 36a of the first metal terminal 30a is connected to the first extending portion 34a and extends toward the mounting surface to provide a gap between the first or second side surface 14c or 14d that faces the mounting surface and the mounting surface. This arrangement increases the distance from the mounting board and reduces the stress applied by the mounting board. In addition, the thickness of a lower portion of the cover material 50 is able to be increased to provide sufficient insulation. More specifically, the second extending portion 36a extends from an end of the first extending portion 34a and is curved toward the mounting surface. The curved portion may be curved either at an obtuse angle or at a right or substantially right angle.

The length of the second extending portion 36a of the first metal terminal 30a in the width direction Y of the multilayer ceramic electronic component 10A is not particularly limited, but is preferably equal or substantially equal to the length of the first extending portion 34a in the width direction Y of the multilayer ceramic electronic component 10A.

The distance by which the second extending portion 36a extends toward the mounting surface is preferably set so that the gap between the surface of the cover material 50 (described below) that faces the mounting surface and the mounting surface is in the range from, for example, about 0.15 mm to about 2 mm. Since the multilayer ceramic electronic component body 12 covered by the cover material 50 is raised above the mounting surface, the distance from the mounting board is increased, and the effect of reducing the stress applied by the mounting board is improved. In addition, the thickness of a lower portion of the cover material 50 is able to be increased to provide sufficient insulation.

Similar to the first extending portion 34a, the second extending portion 36a may include a portion whose surface is processed into a recessed shape so that the base material of the first metal terminal 30a is exposed at the processed portion. Accordingly, even if the joining material in the joined section is melted, solder leakage is able to be prevented because the wettability for the solder is reduced at the processed portion having a recessed shape at which the base material of the first metal terminal 30a is exposed. Thus, the melted solder does not easily flow out of the cover material 50.

The second extending portion 36a may include a cut portion at the center or approximate center thereof so that the second extending portion 36a branches into two or more portions. In such a case, the stress applied by the mounting board after the mounting process is able to be reduced.

The second extending portion 36a may include bending cut portions 40a in both end portions thereof in the width direction Y of the multilayer ceramic electronic component 10A. The bending cut portions 40a receive the material of the first metal terminal 30a when the first metal terminal 30a is bent, thus increasing the bendability of the first metal terminal 30a.

The fourth extending portion 36b of the second metal terminal 30b is connected to the third extending portion 34b and extends toward the mounting surface to provide a gap between the first or second side surface 14c or 14d that faces the mounting surface and the mounting surface. This arrangement increases the distance from the mounting board and reduces the stress applied by the mounting board. In addition, the thickness of a lower portion of the cover material 50 is able to be increased to provide sufficient insulation. More specifically, the fourth extending portion 36b extends from an end of the third extending portion 34b and is curved toward the mounting surface. The curved portion may be curved either at an obtuse angle or at a right or substantially right angle.

The length of the fourth extending portion 36b of the second metal terminal 30b in the width direction Y of the multilayer ceramic electronic component 10A is not particularly limited, but is preferably equal or substantially equal to the length of the second extending portion 34b in the width direction Y of the multilayer ceramic electronic component 10A.

The distance by which the fourth extending portion 36b extends toward the mounting surface is preferably set so that the gap between the surface of the cover material 50 (described below) that faces the mounting surface and the mounting surface is in the range from, for example, about 0.15 mm to about 2 mm. Since the multilayer ceramic electronic component body 12 covered by the cover material 50 is raised above the mounting surface, the distance from the mounting board is increased, and the effect of reducing the stress applied by the mounting board is improved. In addition, the thickness of a lower portion of the cover material 50 is able to be increased to provide sufficient insulation.

Similar to the third extending portion 34b, the fourth extending portion 36b may include a portion whose surface is processed into a recessed shape so that the base material of the second metal terminal 30b is exposed at the processed portion. Accordingly, even if the joining material in the joined section is melted, solder leakage is able to be prevented because the wettability for the solder is reduced at the processed portion having a recessed shape at which the base material of the second metal terminal 30b is exposed. Thus, the melted solder does not easily flow out of the cover material 50.

The fourth extending portion 36b may include a cut portion at the center or approximate center thereof so that the fourth extending portion 36b branches into two or more portions. In such a case, the stress applied by the mounting board after the mounting process is able to be reduced.

The fourth extending portion 36b may include bending cut portions 40b in both end portions thereof in the width direction Y of the multilayer ceramic electronic component 10A. The bending cut portions 40b receive the material of the second metal terminal 30b when the second metal terminal 30b is bent, thus increasing the bendability of the second metal terminal 30b.

(d) First Mounting Portion and Second Mounting Portion

The first mounting portion 38a of the first metal terminal 30a is connected to the second extending portion 36a and mounted on the mounting board. The first mounting portion 38a extends parallel or substantially parallel to the mounting surface.

The first mounting portion 38a of the first metal terminal 30a preferably has, for example, a rectangular or substantially rectangular shape.

The length of the first mounting portion 38a in the width direction Y of the multilayer ceramic electronic component 10A is not particularly limited, but is preferably equal or substantially equal to the length of the second extending portion 36a in the width direction Y of the multilayer ceramic electronic component 10A. An edge of the first mounting portion 38a that is opposite to the edge connected to the second extending portion 36a may include a cut portion at the center or approximate center thereof so that the first mounting portion 38a branches into two or more portions. In such a case, the amount of material of the metal terminals is able to be reduced, so that the cost is able to be reduced. In addition, the stress applied by the mounting board after the mounting process is able to be reduced. In the case in which the cut portion is provided, the first mounting portion 38a may be partially cut at the center or approximate center thereof. Preferably, the outermost ends of the first mounting portion 38a are aligned with the ends of the second extending portion 36a.

The length of the first mounting portion 38a in the width direction Y of the multilayer ceramic electronic component 10A is preferably set to satisfy the following expression: area ($mm^2$) of first and second mounting portions ≥weight (g) of multilayer ceramic electronic component 10A×2/cohesive force of solder. In such a case, the adhesion strength between the mounting board and the multilayer ceramic electronic component 10A is sufficient relative to the gravitational mass of the multilayer ceramic electronic component 10A, so that the multilayer ceramic electronic component 10A is not easily removed from the mounting board. The cohesive force of the solder is determined by a tensile test in which the multilayer ceramic electronic component 10A is pulled away from the mounting board, and is defined as a force applied when the multilayer ceramic electronic component 10A is separated from the mounting board at the solder used to mount the multilayer ceramic electronic component 10A.

The second mounting portion 38b of the second metal terminal 30b is connected to the fourth extending portion 36b and mounted on the mounting board. The second mounting portion 38b extends parallel or substantially parallel to the mounting surface.

The second mounting portion 38b of the second metal terminal 30b preferably has, for example, a rectangular or substantially rectangular shape.

The length of the second mounting portion 38b in the width direction Y of the multilayer ceramic electronic component 10A is not particularly limited, but is preferably equal or substantially equal to the length of the fourth extending portion 36b in the width direction Y of the multilayer ceramic electronic component 10A. An edge of the second mounting portion 38b that is opposite to the edge connected to the fourth extending portion 36b may include a cut portion at the center or approximate center thereof so that the second mounting portion 38b branches into two or more portions. In such a case, the amount of material of the metal terminals is able to be reduced, so that the cost is able to be reduced. In addition, the stress applied by the mounting board after the mounting process is able to be reduced. In the case in which the cut portion is provided, the second mounting portion 38b may be partially cut at the center or approximate center thereof. Preferably, the outermost ends of the first mounting portion 38a are aligned with the ends of the fourth extending portion 36b.

The length of the second mounting portion 38b in the width direction Y of the multilayer ceramic electronic component 10A is preferably set to satisfy the following expression: area ($mm^2$) of first and second mounting portions ≥weight (g) of multilayer ceramic electronic component 10A×2/cohesive force of solder. In such a case, the adhesion strength between the mounting board and the multilayer ceramic electronic component 10A is sufficient relative to the gravitational mass of the multilayer ceramic electronic component 10A, so that the multilayer ceramic electronic component 10A is not easily removed from the mounting board. The cohesive force of the solder is determined by a tensile test in which the multilayer ceramic electronic component 10A is pulled away from the mounting board, and is defined as a force applied when the multilayer ceramic electronic component 10A is separated from the mounting board at the solder used to mount the multilayer ceramic electronic component 10A.

Each metal terminal 30 includes a terminal body and a plating film provided on the surface of the terminal body.

The terminal body is preferably made of, for example, oxygen free copper or a Cu-based alloy having a high thermal conductivity. More specifically, for example, the terminal body may be made of oxygen free copper or phosphor bronze. By using a highly thermally conductive copper-based material as a material of the metal terminals 30, the ESR and thermal resistance are able to be further reduced. The thickness of the terminal body of each metal terminal 30 is preferably in the range from about 0.05 mm to about 0.5 mm, for example.

The plating film includes a lower plating film and an upper plating film. The lower plating film is provided on the surface of the terminal body, and the upper plating film is provided on the surface of the lower plating film. Each of the lower plating film and the upper plating film may include a plurality of plating films.

The lower plating film may preferably be made of, for example, Ni, Fe, Cu, Ag, Cr or an alloy containing at least one or more of these metals as the main components. Preferably, the lower plating film is made of, for example, Ni, Fe, Cr or an alloy containing at least one or more of these metals as the main components.

The thickness of the lower plating film is preferably in the range from, for example, about 0.2 μm to about 5.0 μm.

The upper plating film may preferably be made of, for example, Sn, Ag, Au, or an alloy containing at least one or more of these metals as the main components. Preferably, the upper plating film is made of, for example, Sn or an alloy containing Sn as the main component. When the upper plating film is made of Sn or an alloy containing Sn as the main component, solderability of the metal terminals 30 and the outer electrodes 26 is improved.

The thickness of the upper plating film is preferably in the range from, for example, about 1.0 µm to about 5.0 µm.

When the terminal body and the lower plating film are each made of Ni, Fe, or Cr having high melting points or an alloy containing at least one or more of these metals as the main components, the heat resistance of the outer electrodes 26 is increased.

The plating film may be omitted at least on the peripheral surfaces of the mounting portions 38a and 38b and the extending portions 34a, 34b, 36a, and 36b of the metal terminals 30. In such a case, solder used to mount the multilayer ceramic electronic component 10A does not easily spread upward along the metal terminals 30. Therefore, the solder does not easily spread into the spaces between the multilayer ceramic electronic component body 12 and the metal terminals 30 (raised portions), and the raised portions is able to be prevented from being filled with the solder. Accordingly, the raised portions have a sufficiently large space, so that transmission of vibration to the board is able to be reduced or prevented and the multilayer ceramic electronic component 10A has a stable squeal reducing effect. The plating film may be omitted on all of the peripheral surfaces of the metal terminals 30.

The plating film may be removed from the peripheral surfaces of the mounting portions 38a and 38b and the extending portions 34a, 34b, 36a, and 36b of the metal terminals 30 or from all of the peripheral surfaces of the metal terminals 30 by, for example, a mechanical method (cutting or grinding), by laser trimming, or by using a plating remover (for example, sodium hydroxide). Alternatively, portions of the metal terminals 30 on which no plating film is to be provided may be covered with a resist before providing the plating film, and then the resist may be removed after the plating film is provided on the metal terminals 30.

(3) Joining Material

The joining material is used to connect the first outer electrode 26a and the first metal terminal 30a to each other and the second outer electrode 26b and the second metal terminal 30b to each other.

The joining material is preferably solder, in particular, for example, a Pb-free solder having a high melting point. In such a case, the multilayer ceramic electronic component body 12 and the metal terminals 30 may be sufficiently strongly joined together, and the joined section is sufficiently resistant to heat at the flow or reflow temperature in the mounting process.

The Pb-free solder having a high melting point is preferably a lead-free solder such as, for example, Sn—Sb-based, Sn—Ag—Cu-based, Sn—Cu-based, or Sn—Bi-based solder, in particular, any of Sn-10Sb to Sn-15Sb solders. In such a case, the joined section is sufficiently resistant to heat in the mounting process.

(4) Cover Material

The cover material 50 covers the multilayer ceramic electronic component body 12, the first outer electrode 26a, the second outer electrode 26b, a portion of the first metal terminal 30a (the first terminal joining portion 32a and at least a portion of the first extending portion 34a), and a portion of the second metal terminal 30b (the second terminal joining portion 32b and at least a portion of the third extending portion 34b). Thus, the length of the portion molded by the cover material 50 is able to be increased. As a result, a sufficient insulating surface distance (creeping distance) is able to be provided between the conductors. In addition, since the multilayer ceramic electronic component body 12 is molded by the cover material 50, the risk of surface discharge is able to be reduced.

The shape of the cover material 50 is not particularly limited, and may preferably be a rectangular or substantially rectangular parallelepiped shape. The cover material 50 may instead have a substantially trapezoidal shape. The shape of corner portions of the cover material 50 is not particularly limited, and the corner portions may be rounded.

The first principal surface 50a and the second principal surface 50b of the cover material 50 preferably have a planar shape. In such a case, the first principal surface 50a and the second principal surface 50b are sufficiently flat, and suction failure of a mounter of a mounting device used to mount the multilayer ceramic electronic component 10A onto the mounting board is able to be prevented. Accordingly, the multilayer ceramic electronic component 10A is able to be reliably mounted onto the mounting board. As a result, the occurrence of mounting failure is able to be prevented.

The cover material 50 is formed by, for example, applying silicone-based or epoxy-based resin in liquid or powder form. The cover material 50 may instead be formed by molding an engineering plastic material by injection molding or transfer molding. In particular, the material of the cover material 50 is preferably a thermosetting epoxy resin, for example. In such a case, sufficient adhesion is provided between the cover material 50 and the multilayer ceramic electronic component body 12 or between the cover material 50 and the metal terminals 30, and the voltage resistance and moisture resistance are able to be increased.

The dimension of the multilayer ceramic electronic component 10A including the multilayer ceramic electronic component body 12, the cover material 50, the first metal terminal 30a, and the second metal terminal 30b in the length direction Z is defined as dimension L. In other words, the length of the multilayer ceramic electronic component 10A in the length direction Z connecting the end surfaces of the multilayer ceramic electronic component body 12 is defined as dimension L. The dimension L is preferably in the range from, for example, about 10 mm to about 15 mm.

The dimension of the multilayer ceramic electronic component 10A including the multilayer ceramic electronic component body 12, the cover material 50, the first metal terminal 30a, and the second metal terminal 30b in the width direction Y is defined as dimension W. In other words, the length of the multilayer ceramic electronic component 10A in the width direction Y connecting the principal surfaces of the multilayer ceramic electronic component body 12 is defined as dimension W. The dimension W is preferably in the range from, for example, about 3.0 mm to about 5.5 mm.

The dimension of the multilayer ceramic electronic component 10A including the multilayer ceramic electronic component body 12, the cover material 50, the first metal terminal 30a, and the second metal terminal 30b in the height direction X is defined as dimension T. In other words, the length of the multilayer ceramic electronic component 10A in the height direction X connecting the side surfaces of the multilayer ceramic electronic component body 12 is defined as dimension T. The dimension T is preferably in the range from, for example, about 1.0 mm to about 5.5 mm.

The amount of heat $P_{LOSS}$ generated by a multilayer ceramic capacitor may be expressed as in Equation (1).

$$P_{LOSS} = \frac{V_{DC}^2}{IR} + I_{AC}^2 \times ESR \qquad (1)$$

In Equation (1), $V_{DC}$ is the DC bias voltage (V), $I_{AC}$ is the ripple current (A), IR is the insulation resistance (Ω) of the multilayer ceramic capacitor, and ESR is the equivalent series resistance (Ω) of the multilayer ceramic capacitor with respect to an AC signal.

The amount of dissipated heat $P_{DIS}$ can be expressed as in Equation (2).

$$P_{DIS} = \frac{(T - T_0)}{R_\theta} \qquad (2)$$

In Equation (2), $R_\theta$ is the thermal resistance (° C./W), T is the temperature (° C.) of the multilayer ceramic capacitor, and $T_0$ is a reference temperature (° C.).

Equation (1) shows that the amount of heat generated by the multilayer ceramic capacitor is able to be reduced by reducing ESR, and Equation (2) shows that the thermal resistance is also able to be reduced as a result.

The multilayer ceramic electronic component 10A illustrated in FIG. 1 is structured such that the first extended electrode portions 22a of the first inner electrode layers 18a extend to the first end surface 14e, a portion of the first side surface 14c, and a portion of the second side surface 14d, and such that the second extended electrode portions 22b of the second inner electrode layers 18b extend to the second end surface 14f, a portion of the first side surface 14c, and a portion of the second side surface 14d. Accordingly, the contact area between the outer electrodes 26 and the inner electrode layers 18 is increased, and the ESR and thermal resistance is able to be reduced.

The distance between an end 26a1 of the first outer electrode 26a on the first or second side surface 14c or 14d and an end 26b1 of the second outer electrode 26b on the first or second side surface 14c or 14d is preferably in the range from, for example, about 1.8% to about 31.3% of the dimension l of the multilayer ceramic electronic component body 12 in the direction connecting the first end surface 14e and the second end surface 14f of the multilayer ceramic electronic component body 12. Accordingly, the contact area between the outer electrodes 26 and the inner electrode layers 18 is further increased, and the ESR and thermal resistance is able to be reduced.

In addition, by increasing the dimension e of the outer electrodes 26, the length of the metal terminals 30 is also able to be increased and the thermal resistance is able to be further reduced.

When the material of the metal terminals 30 is a highly thermally conductive copper-based material, such as oxygen free copper or phosphor bronze, for example, the ESR and thermal resistance are able to be further reduced.

The cover material 50 covers the multilayer ceramic electronic component body 12, the first outer electrode 26a, the second outer electrode 26b, a portion of the first metal terminal 30a (the first terminal joining portion 32a and at least a portion of the first extending portion 34a), and a portion of the second metal terminal 30b (the second terminal joining portion 32b and at least a portion of the third extending portion 34b). Thus, the length of the portion molded by the cover material 50 is able to be increased. As a result, a sufficient insulating surface distance (creeping distance) is able to be provided between the conductors. In addition, since the multilayer ceramic electronic component body 12 is molded by the cover material 50, the risk of surface discharge is able to be reduced.

Second Preferred Embodiment

Figure 13:
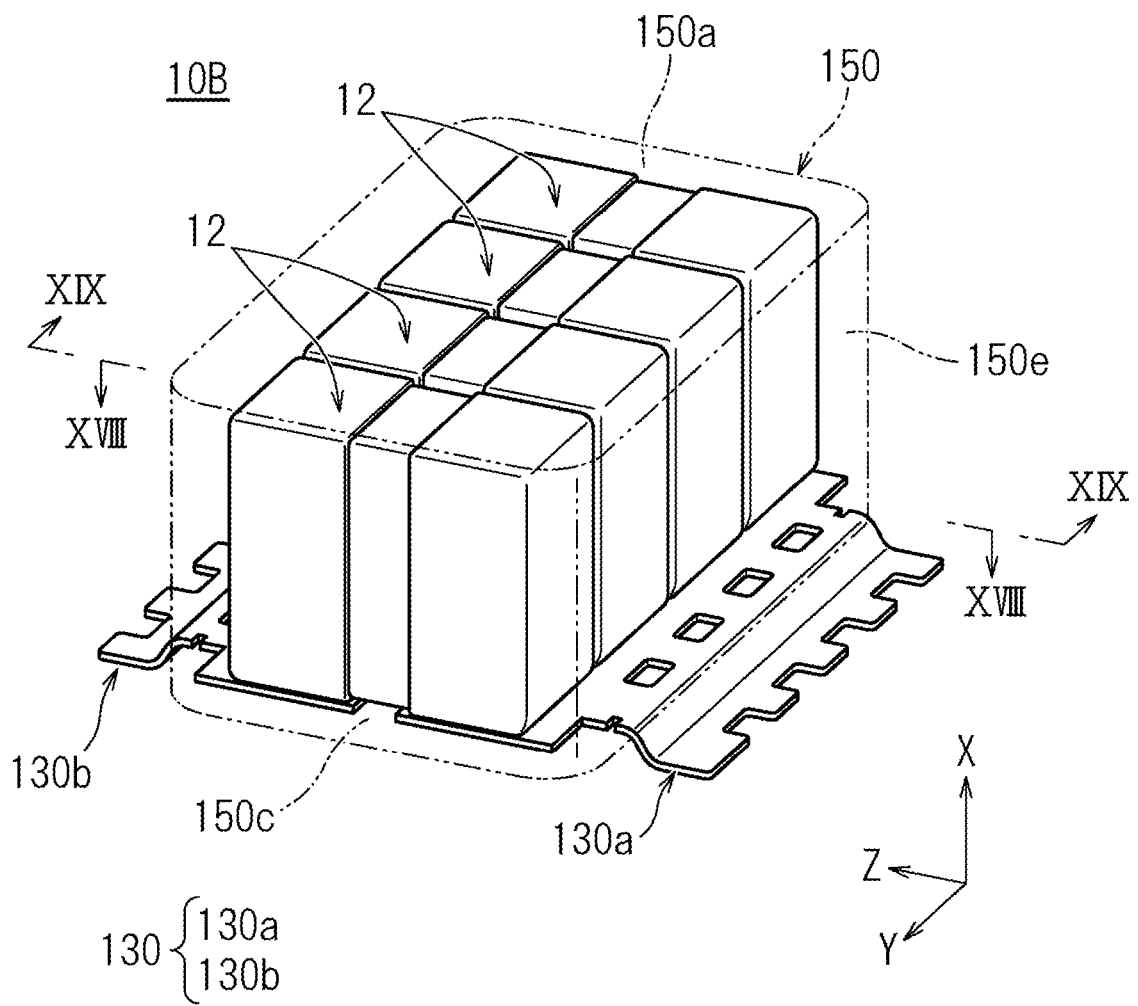
FIG. 13 is an external perspective view of an example of a multilayer ceramic electronic component according to a second preferred embodiment of the present invention.
Figure 14:
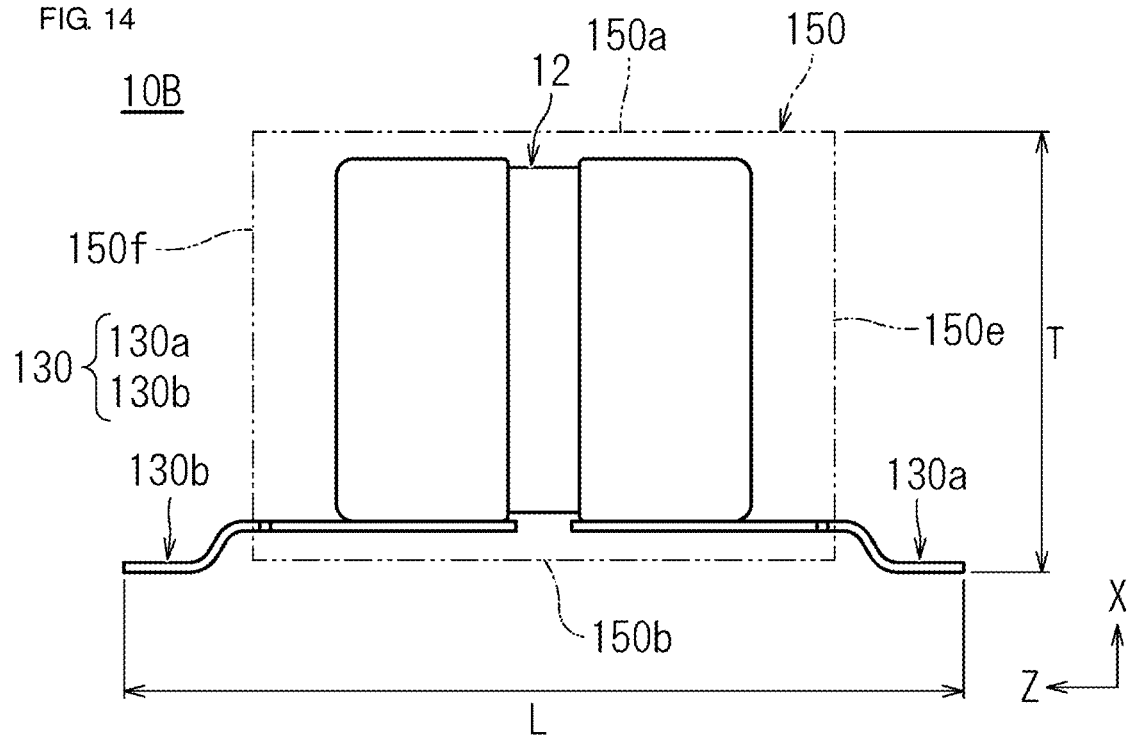
FIG. 14 is a front view of the multilayer ceramic electronic component illustrated in FIG. 13.
Figure 15:
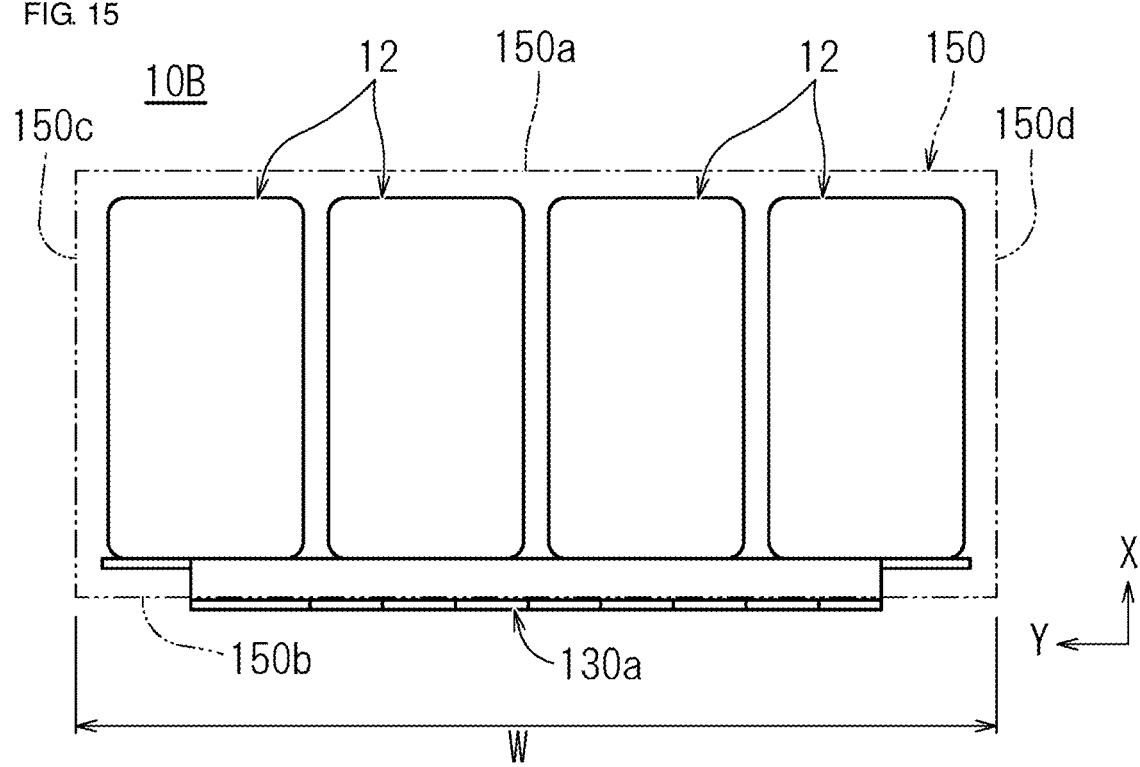
FIG. 15 is a side view of the multilayer ceramic electronic component illustrated in FIG. 13.
Figure 16:
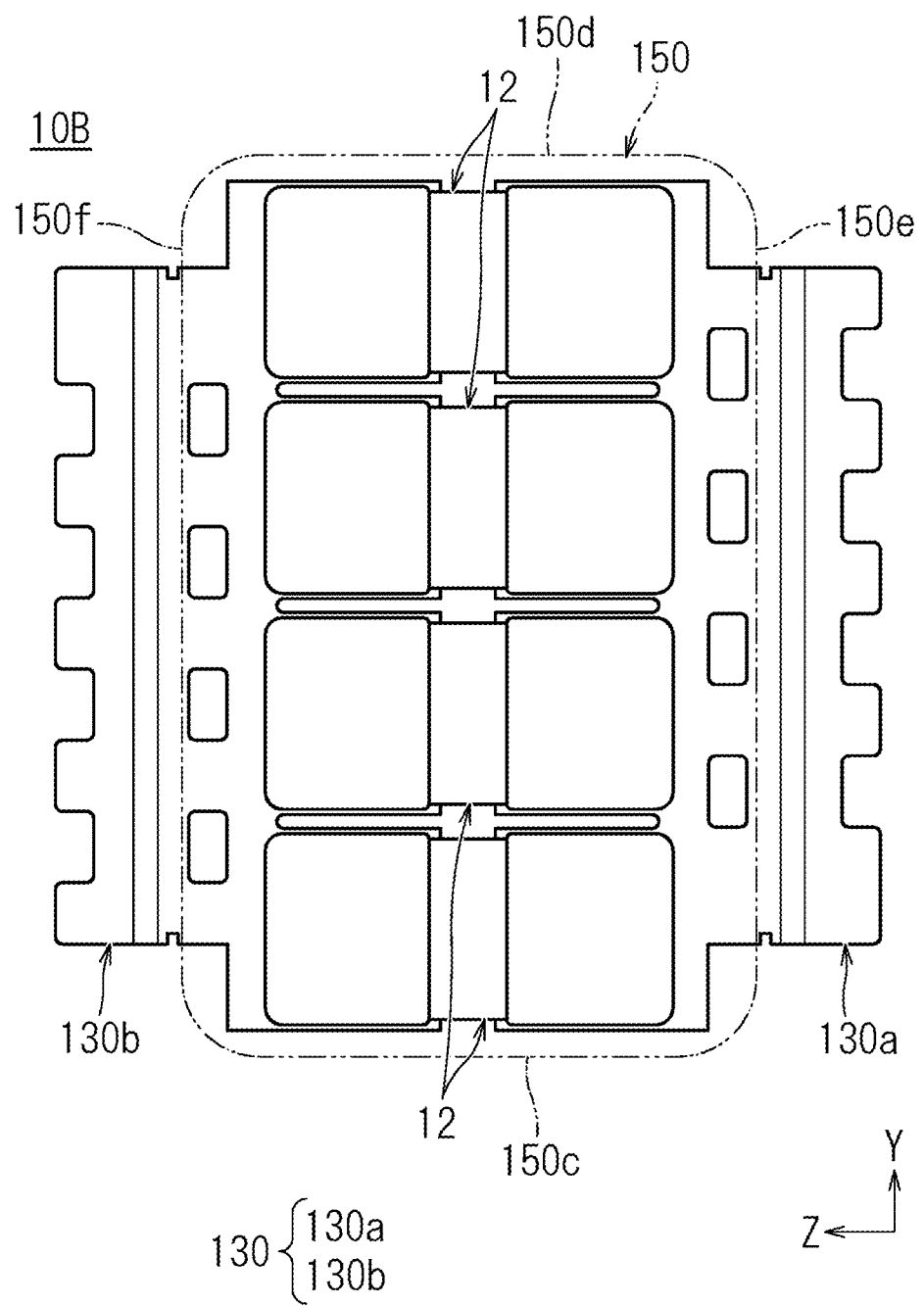
FIG. 16 is a top view of the multilayer ceramic electronic component illustrated in FIG. 13.
Figure 17:
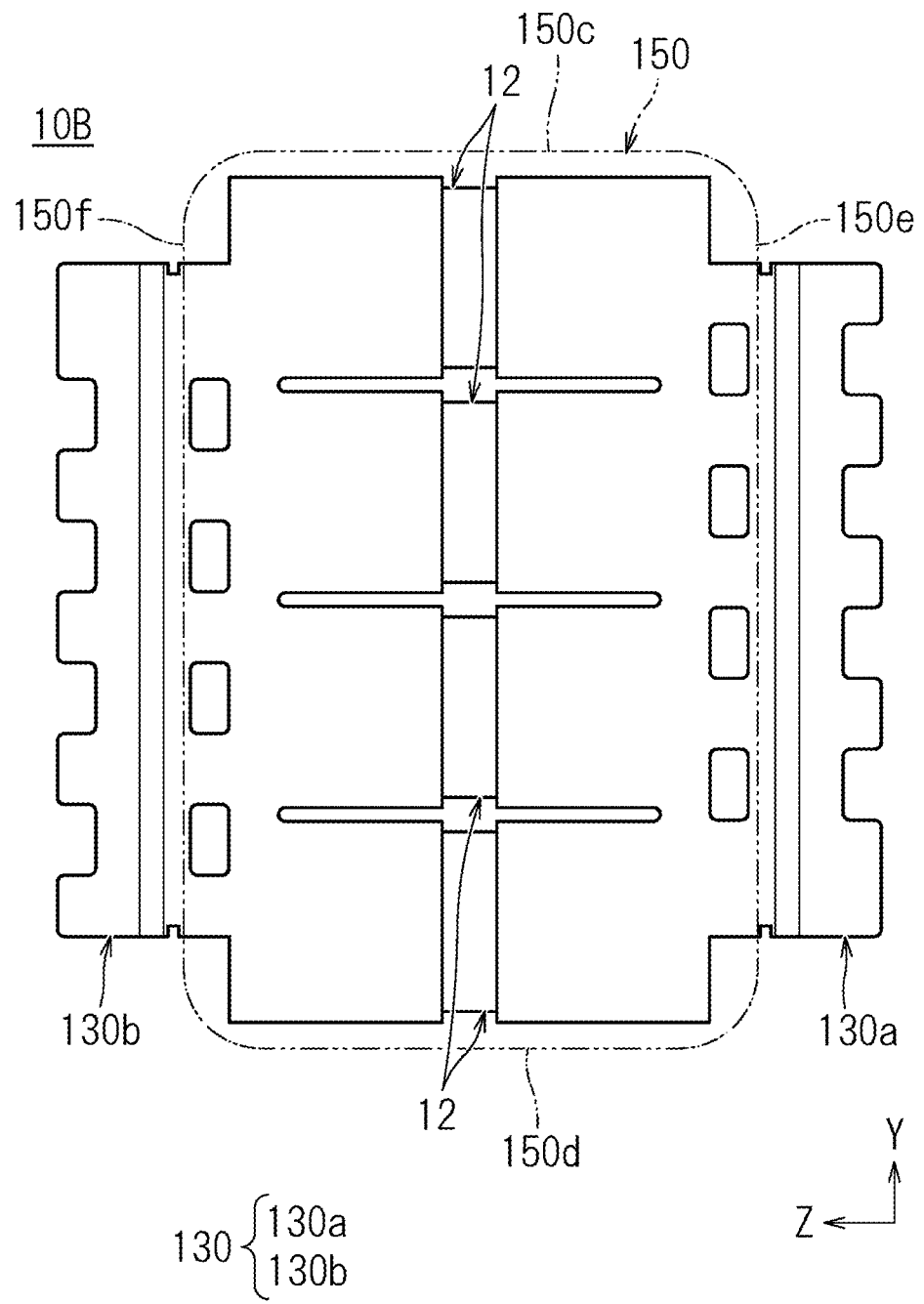
FIG. 17 is a bottom view of the multilayer ceramic electronic component illustrated in FIG. 13.
Figure 18:
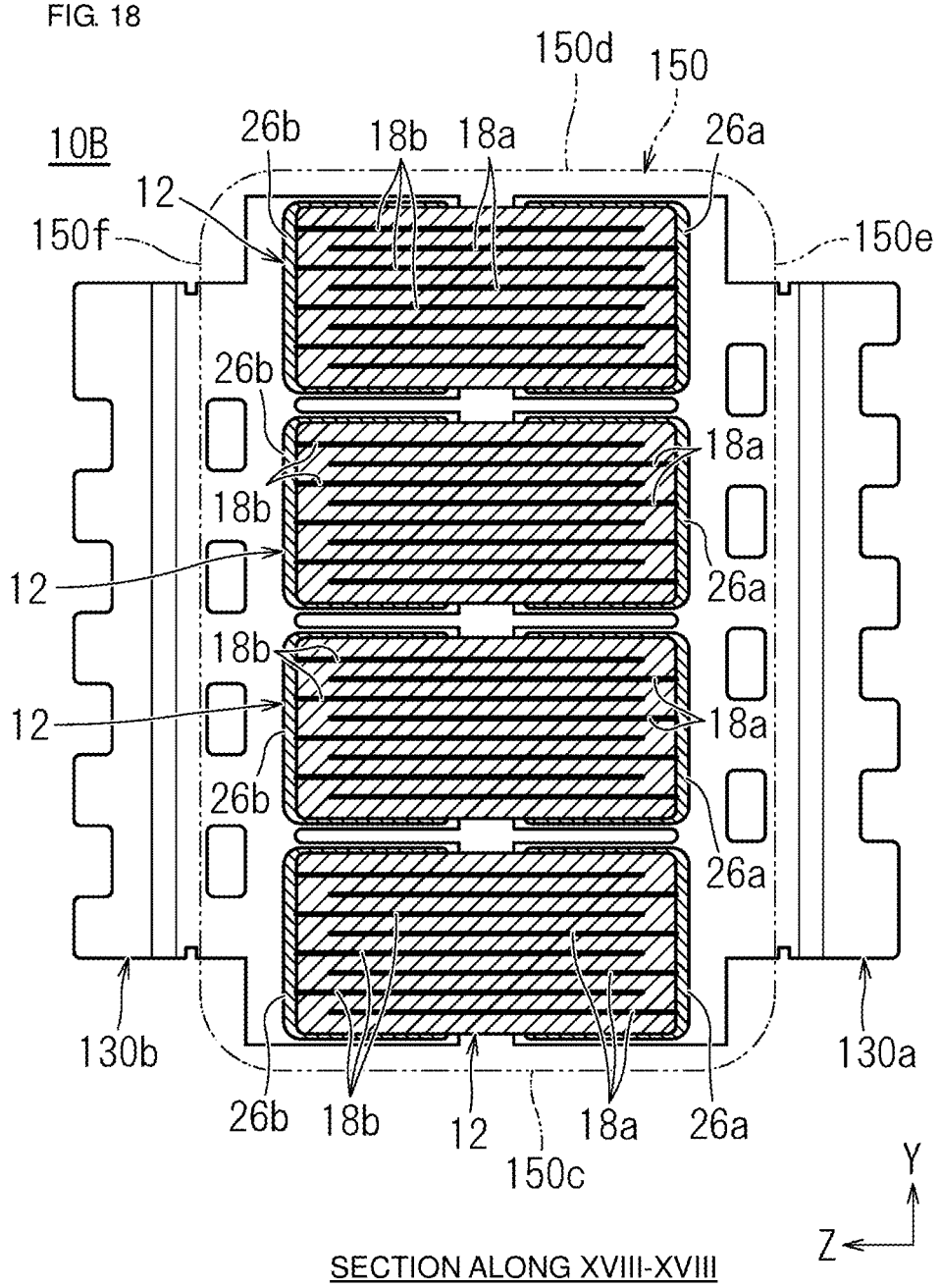
FIG. 18 is a sectional view of the multilayer ceramic electronic component illustrated in FIG. 13 taken along line XVIII-XVIII.
Figure 19:
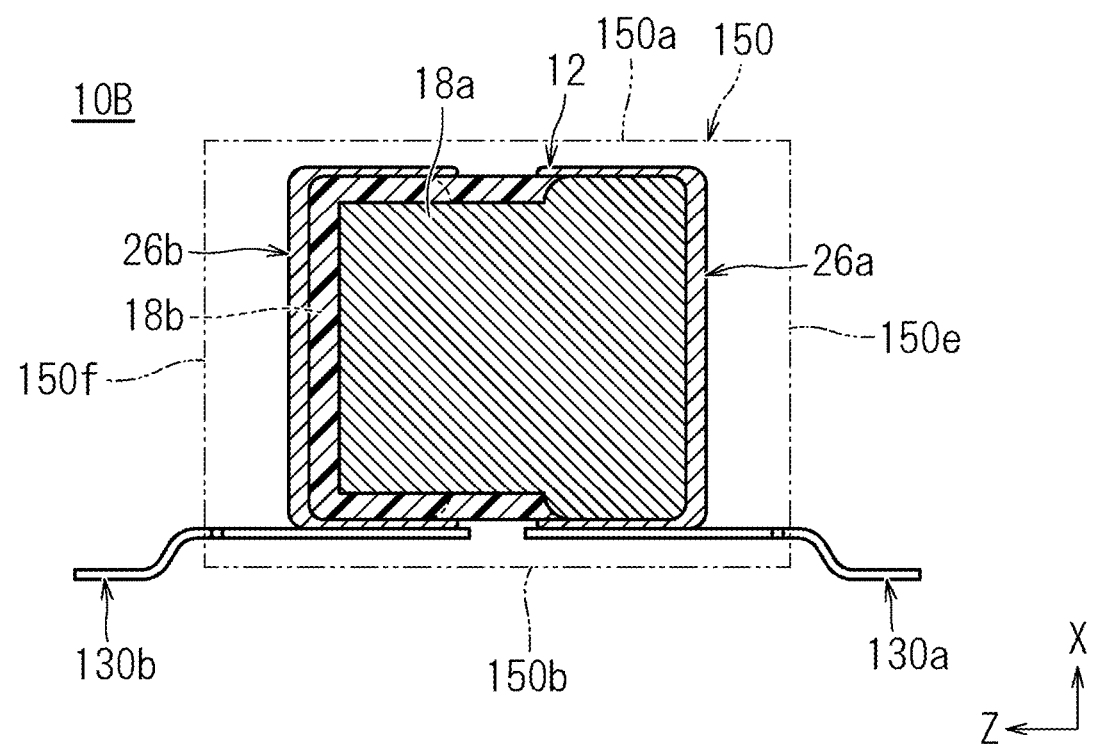
FIG. 19 is a sectional view of the multilayer ceramic electronic component illustrated in FIG. 13 taken along line XIX-XIX.
Figure 20:
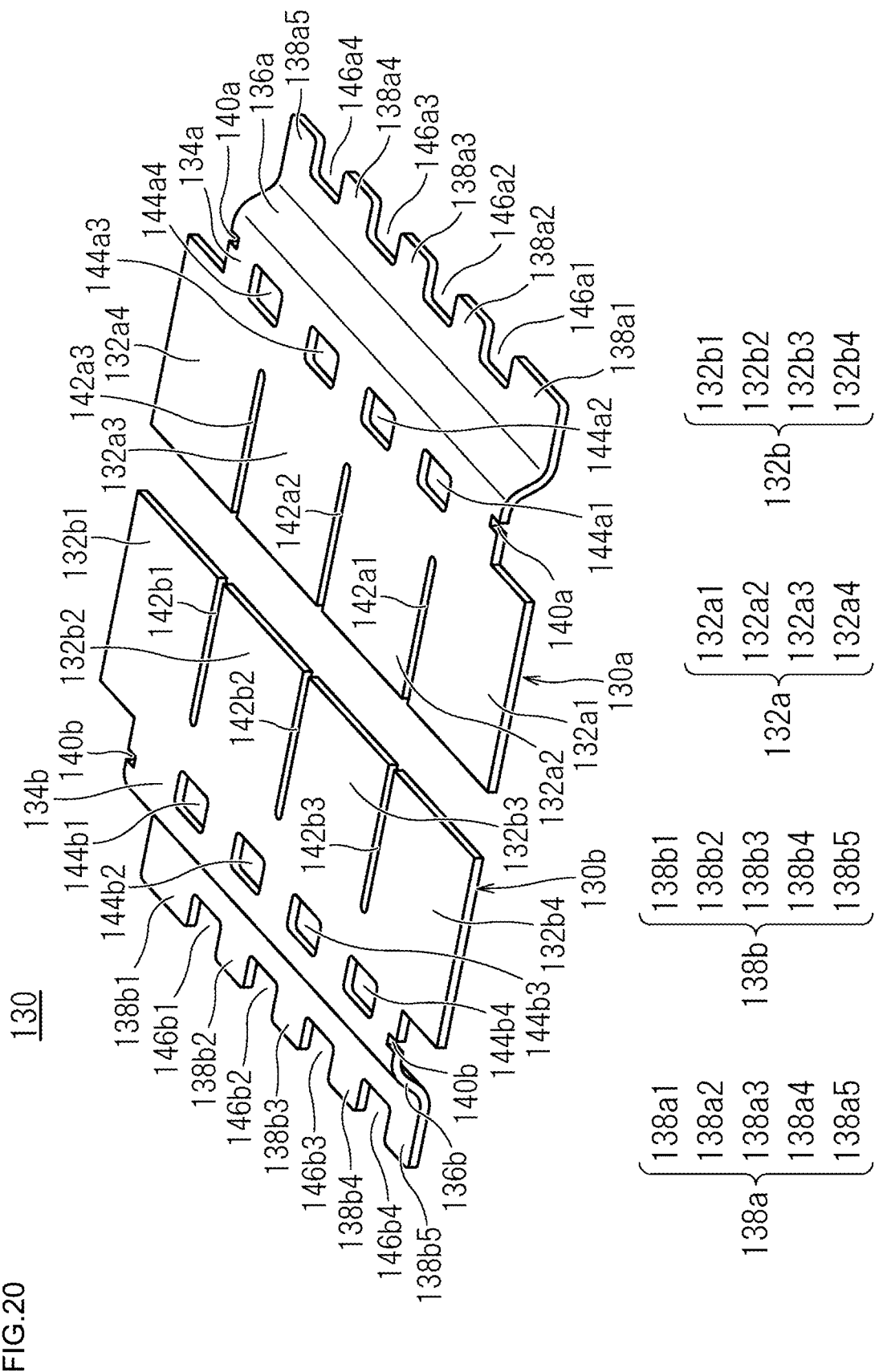
FIG. 20 is an external perspective view of metal terminals included in the multilayer ceramic electronic component according to the second preferred embodiment of the present invention.

A multilayer ceramic electronic component according to a second preferred embodiment of the present invention will now be described. FIG. 13 is an external perspective view of an example of a multilayer ceramic electronic component according to a second preferred embodiment of the present invention. FIG. 14 is a front view of the multilayer ceramic electronic component illustrated in FIG. 13. FIG. 15 is a side view of the multilayer ceramic electronic component illustrated in FIG. 13. FIG. 16 is a top view of the multilayer ceramic electronic component illustrated in FIG. 13. FIG. 17 is a bottom view of the multilayer ceramic electronic component illustrated in FIG. 13. FIG. 18 is a sectional view of the multilayer ceramic electronic component illustrated in FIG. 13 taken along line XVIII-XVIII. FIG. 19 is a sectional view of the multilayer ceramic electronic component illustrated in FIG. 13 taken along line XIX-XIX. FIG. 20 is an external perspective view of metal terminals included in the multilayer ceramic electronic component according to the second preferred embodiment of the present invention.

A multilayer ceramic electronic component 10B according to the present preferred embodiment has a structure similar to that of the multilayer ceramic electronic component 10A described with reference to FIG. 1, except that a plurality of multilayer ceramic electronic component bodies 12 are provided and that the structures of a pair of metal terminals 130 and a cover material 150 differ from those of the pair of metal terminals 30 and the cover material 50. Accordingly, components that are the same as or similar to those in the multilayer ceramic electronic component 10A illustrated in FIG. 1 are denoted by the same reference signs, and description thereof is thus omitted.

The multilayer ceramic electronic component 10B according to the second preferred embodiment includes the plurality of multilayer ceramic electronic component bodies 12. Each multilayer ceramic electronic component body 12 includes a rectangular or substantially rectangular-parallelepiped-shaped multilayer body 14 and outer electrodes 26. The multilayer ceramic electronic component 10B also includes metal terminals 130 connected to the outer electrodes 26 of the multilayer ceramic electronic component body 12 and a cover material 150 that covers the multilayer bodies 14, the outer electrodes 26, and portions of the metal terminals 130.

The multilayer ceramic electronic component bodies 12 included in the multilayer ceramic electronic component 10B are arranged such that the principal surfaces thereof face each other. The multilayer ceramic electronic component bodies 12 of the multilayer ceramic electronic component 10B have gaps therebetween. The gaps are preferably in the range from, for example, about 0.45 mm to about 1.0 mm. In such a case, resin that fills the gaps provides sufficient heat insulation, and the amount of heat generated is able to be reduced.

The direction in which the metal terminals 130 of the multilayer ceramic electronic component 10B extend (in other words, the direction connecting a first end surface 14e and a second end surface 14f of each multilayer ceramic electronic component body 12) is defined as a length direction Z of the multilayer ceramic electronic component 10B. The direction connecting a first principal surface 14a and a second principal surface 14b of each multilayer ceramic electronic component body 12 is defined as a width direction Y of the multilayer ceramic electronic component 10B. The direction connecting a first side surface 14c and a second side surface 14d of each multilayer ceramic electronic component body 12 is defined as a height direction X of the multilayer ceramic electronic component 10B.

The cover material 150 includes a first principal surface 150a and a second principal surface 150b that are respectively adjacent to the first side surface 14c and the second side surface 14d of each multilayer ceramic electronic component body 12; a first side surface 150c and a second side surface 150d that are respectively adjacent to the first principal surface 14a and the second principal surface 14b of each multilayer ceramic electronic component body 12; and a first end surface 150e and a second end surface 150f that are respectively adjacent to the first end surface 14e and the second end surface 14f of each multilayer ceramic electronic component body 12.

The metal terminals 130 of the multilayer ceramic electronic component 10B illustrated in FIG. 20 include a first metal terminal 130a and a second metal terminal 130b.

The first metal terminal 130a is connected to the first outer electrode 26a of each multilayer ceramic electronic component body 12 by a joining material. More specifically, the first metal terminal 130a is connected to the first outer electrode 26a on the first or second side surface 14c or 14d of each multilayer ceramic electronic component body 12.

The second metal terminal 130b is connected to the second outer electrode 26b of each multilayer ceramic electronic component body 12 by a joining material. More specifically, the second metal terminal 130b is connected to the second outer electrode 26b on the first or second side surface 14c or 14d of each multilayer ceramic electronic component body 12.

The first metal terminal 130a includes a first terminal joining portion 132a that is connected to the first outer electrode 26a; a first extending portion 134a that is connected to the first terminal joining portion 132a and extends in a direction parallel or substantially parallel to the first side surface 14c (side surface facing the mounting surface) so as to be spaced apart from the first side surface 14c (side surface facing the mounting surface) and the mounting surface; a second extending portion 136a that is connected to the first extending portion 134a and extends toward the mounting surface positioned opposite each multilayer ceramic electronic component body 12; and a first mounting portion 138a that is connected to the second extending portion 136a and mounted on the mounting board. The structure of the extending portions is not limited to the above-described structure, and a curved extending portion may be additionally provided.

The second metal terminal 130b includes a second terminal joining portion 132b that is connected to the second outer electrode 26b; a third extending portion 134b that is connected to the second terminal joining portion 132b and extends in a direction parallel or substantially parallel to the first side surface 14c (side surface facing the mounting surface) so as to be spaced apart from the first side surface 14c (side surface facing the mounting surface) and the mounting surface; a fourth extending portion 136b that is connected to the third extending portion 134b and extends toward the mounting surface positioned opposite each multilayer ceramic electronic component body 12; and a second mounting portion 138b that is connected to the fourth extending portion 136b and mounted on the mounting board. The structure of the extending portions is not limited to the above-described structure, and a curved extending portion may be additionally provided.

(a) First Terminal Joining Portion and Second Terminal Joining Portion

The first terminal joining portion 132a of the first metal terminal 130a is joined to the first outer electrode 26a on the first side surface 14c (side surface facing the mounting surface) of each multilayer ceramic electronic component body 12. As illustrated in FIG. 20, the first terminal joining portion 132a of the first metal terminal 130a included in the multilayer ceramic electronic component 10B illustrated in FIG. 13 differs from the first terminal joining portion 32a of the first metal terminal 30a in that a plurality of first gaps 142a1 to 142a3 are provided at positions between the multilayer ceramic electronic component bodies 12. The first gaps 142a1 to 142a3 divide the first terminal joining portion 132a into a plurality of first joining tabs 132a1 to 132a4. Thus, the first joining tabs 132a1 to 132a4 are provided for the first outer electrodes 26a of respective ones of the multilayer ceramic electronic component bodies 12.

In the case in which the first joining tabs 132a1 to 132a4 are individually provided for the first outer electrodes 26a of the respective multilayer ceramic electronic component bodies 12 as illustrated in FIG. 20, the length of each of the first joining tabs 132a1 to 132a4 of the first terminal joining portion 132a of the first metal terminal 130a in the width direction Y preferably corresponds to the length of the first outer electrode 26a on the first side surface 14c (side surface facing the mounting surface) of each multilayer ceramic electronic component body 12 in the lamination direction x.

One end of the first terminal joining portion 132a of the first metal terminal 130a, which is positioned near the first end surface 14e of each multilayer ceramic electronic component body 12, preferably protrudes by a distance in the range from, for example, about 0.1 mm to about 0.2 mm from the edge of the first outer electrode 26a on the first or second side surface 14c or 14d (side surface facing the mounting surface) of one of the multilayer ceramic electronic component bodies 12 that is adjacent to the first side surface 150c of the multilayer ceramic electronic component 10B. In such a case, the multilayer ceramic electronic component bodies 12 may be in contact with the metal terminals 130 in equal or substantially equal areas, and the joining strength and the resistance of the metal terminals 130 may be adjusted within certain ranges. The gaps between the multilayer ceramic electronic component bodies 12 are adjusted in accordance with the amount of protrusion.

Similarly, the other end of the first terminal joining portion 132a of the first metal terminal 130a, which is positioned near the first end surface 14e of each multilayer ceramic electronic component body 12, preferably protrudes by a distance in the range from, for example, about 0.1 mm to about 0.2 mm from the edge of the first outer electrode 26a on the first or second side surface 14c or 14d (side surface facing the mounting surface) of one of the multilayer ceramic electronic component bodies 12 that is adjacent to the second side surface 150d of the multilayer ceramic electronic component 10B. In such a case, the multilayer ceramic electronic component bodies 12 may be in contact with the metal terminals 130 in equal or substantially equal areas, and the joining strength and the resistance of the metal terminals 130 may be adjusted within certain ranges. The gaps between the multilayer ceramic electronic component bodies 12 are adjusted in accordance with the amount of protrusion.

The second terminal joining portion 132b of the second metal terminal 130b is joined to the second outer electrode 26b on the first side surface 14c (side surface facing the mounting surface) of each multilayer ceramic electronic component body 12. As illustrated in FIG. 20, the second terminal joining portion 132b of the second metal terminal 130b differs from the second terminal joining portion 32b of the second metal terminal 30b in that a plurality of second gaps 142b1 to 142b3 are provided at positions between the multilayer ceramic electronic component bodies 12. The second gaps 142b1 to 142b3 divide the second terminal joining portion 132b into a plurality of second joining tabs 132b1 to 132b4. Thus, the second joining tabs 132b1 to 132b4 are provided for the second outer electrodes 26b of respective ones of the multilayer ceramic electronic component bodies 12.

In the case in which the second joining tabs 132b1 to 132b4 are individually provided for the second outer electrodes 26b of the respective multilayer ceramic electronic component bodies 12 as illustrated in FIG. 20, the length of each of the second joining tabs 132b1 to 132b4 of the second terminal joining portion 132b of the second metal terminal 130b in the width direction Y preferably corresponds to the length of the second outer electrode 26b on the first side surface 14c (side surface facing the mounting surface) of each multilayer ceramic electronic component body 12 in the lamination direction x.

One end of the second terminal joining portion 132b of the second metal terminal 130b, which is positioned near the second end surface 14f of each multilayer ceramic electronic component body 12, preferably protrudes by a distance in the range from, for example, about 0.1 mm to about 0.2 mm from the edge of the second outer electrode 26b on the first or second side surface 14c or 14d (side surface facing the mounting surface) of one of the multilayer ceramic electronic component bodies 12 that is adjacent to the first side surface 150c of the multilayer ceramic electronic component 10B. In such a case, the multilayer ceramic electronic component bodies 12 may be in contact with the metal terminals 130 in equal or substantially equal areas, and the joining strength and the resistance of the metal terminals 130 may be adjusted within certain ranges. The gaps between the multilayer ceramic electronic component bodies 12 are adjusted in accordance with the amount of protrusion.

Similarly, the other end of the second terminal joining portion 132b of the second metal terminal 130b, which is positioned near the second end surface 14f of each multilayer ceramic electronic component body 12, preferably protrudes by a distance in the range from, for example, about 0.1 mm to about 0.2 mm from the edge of the second outer electrode 26b on the first or second side surface 14c or 14d (side surface facing the mounting surface) of one of the multilayer ceramic electronic component bodies 12 that is adjacent to the second side surface 150d of the multilayer ceramic electronic component 10B. In such a case, the multilayer ceramic electronic component bodies 12 may be in contact with the metal terminals 130 in equal or substantially equal areas, and the joining strength and the resistance of the metal terminals 130 may be adjusted within certain ranges. The gaps between the multilayer ceramic electronic component bodies 12 are adjusted in accordance with the amount of protrusion.

(b) First Extending Portion and Third Extending Portion

The first extending portion 134a of the first metal terminal 130a is connected to the first terminal joining portion 132a and extends away from the multilayer ceramic electronic component bodies 12 in a direction parallel or substantially parallel to the first or second side surface 14c or 14d (side surface facing the mounting surface). The first extending portion 134a of the first metal terminal 130a includes a plurality of first cut portions 144a1 to 144a4.

The third extending portion 134b of the second metal terminal 130b is connected to the second terminal joining portion 132b and extends away from the multilayer ceramic electronic component bodies 12 in a direction parallel or substantially parallel to the first or second side surface 14c or 14d (side surface facing the mounting surface). The third extending portion 134b of the second metal terminal 130b includes a plurality of fourth cut portions 144b1 to 144b4.

(c) Second Extending Portion and Fourth Extending Portion

The second extending portion 136a of the first metal terminal 130a is connected to the first extending portion 134a and extends toward the mounting surface to provide a gap between the first or second side surface 14c or 14d that faces the mounting surface and the mounting surface. The second extending portion 136a may include bending cut portions 140a that differ from the above-described cut portions in both end portions thereof in the width direction Y of the multilayer ceramic electronic component 10B. The bending cut portions 140a receive the material of the first metal terminal 130a when the first metal terminal 130a is bent, thus increasing the bendability of the first metal terminal 130a.

The fourth extending portion 136b of the second metal terminal 130b is connected to the third extending portion 134b and extends toward the mounting surface to provide a gap between the first or second side surface 14c or 14d that faces the mounting surface and the mounting surface. The fourth extending portion 136b may include bending cut portions 140b that differ from the above-described cut portions in both end portions thereof in the width direction Y of the multilayer ceramic electronic component 10B.

(d) First Mounting Portion and Second Mounting Portion

The first mounting portion 138a of the first metal terminal 130a is connected to the second extending portion 136a and mounted on the mounting board. The first mounting portion 138a extends parallel or substantially parallel to the mounting surface.

The first mounting portion 138a of the first metal terminal 130a preferably has, for example, a substantially continuous rectangular shape.

The length of the first mounting portion 138a in the width direction Y of the multilayer ceramic electronic component 10B is not particularly limited, but is preferably equal or substantially equal to the length of the second extending portion 136a in the width direction Y of the multilayer ceramic electronic component 10B. As illustrated in FIG. 20, the first mounting portion 138a may include a plurality of second cut portions 146a1 to 146a4 at the edge opposite to the edge connected to the second extending portion 136a, so that a plurality of first mounting tabs 138a1 to 138a5 are provided. Preferably, the outermost ends of the first mounting portion 138a are aligned with the ends of the second extending portion 136a.

The second mounting portion 138b of the second metal terminal 130b is connected to the fourth extending portion 136b and mounted on the mounting board. The second mounting portion 138b extends parallel or substantially parallel to the mounting surface.

The second mounting portion 138b of the second metal terminal 130b preferably has, for example, a substantially continuous rectangular shape.

The length of the second mounting portion 138b in the width direction Y of the multilayer ceramic electronic component 10B is not particularly limited, but is preferably equal or substantially equal to the length of the fourth extending portion 136b in the width direction Y of the multilayer ceramic electronic component 10B. The second mounting portion 138b may include a plurality of fifth cut portions 146b1 to 146b4 at the edge opposite to the edge connected to the fourth extending portion 136b, so that a plurality of second mounting tabs 138b1 to 138b5 are provided. Preferably, the outermost ends of the first mounting portion 138a are aligned with the ends of the fourth extending portion 136b.

The cover material 150 of the multilayer ceramic electronic component 10B illustrated in FIG. 13 preferably has a rectangular or substantially rectangular parallelepiped shape. The cover material 150 may instead have a substantially trapezoidal shape. The cover material 150 fills the gaps between the multilayer ceramic electronic component bodies 12.

The multilayer ceramic electronic component 10B illustrated in FIG. 13 has the same advantageous effects as those of the multilayer ceramic electronic component 10A illustrated in FIG. 1.

Third Preferred Embodiment

Figure 21:
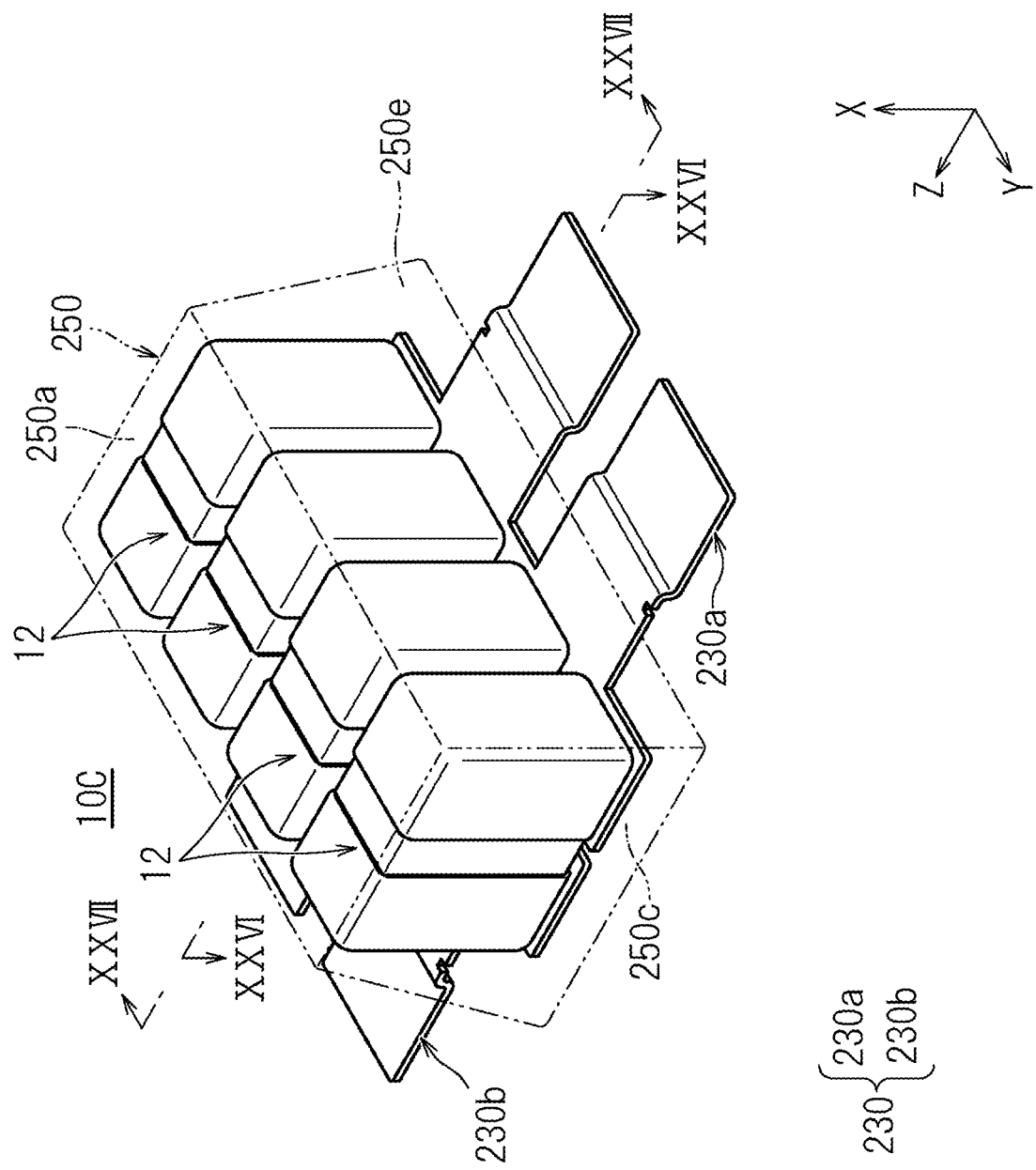
FIG. 21 is an external perspective view of an example of a multilayer ceramic electronic component according to a third preferred embodiment of the present invention.
Figure 22:
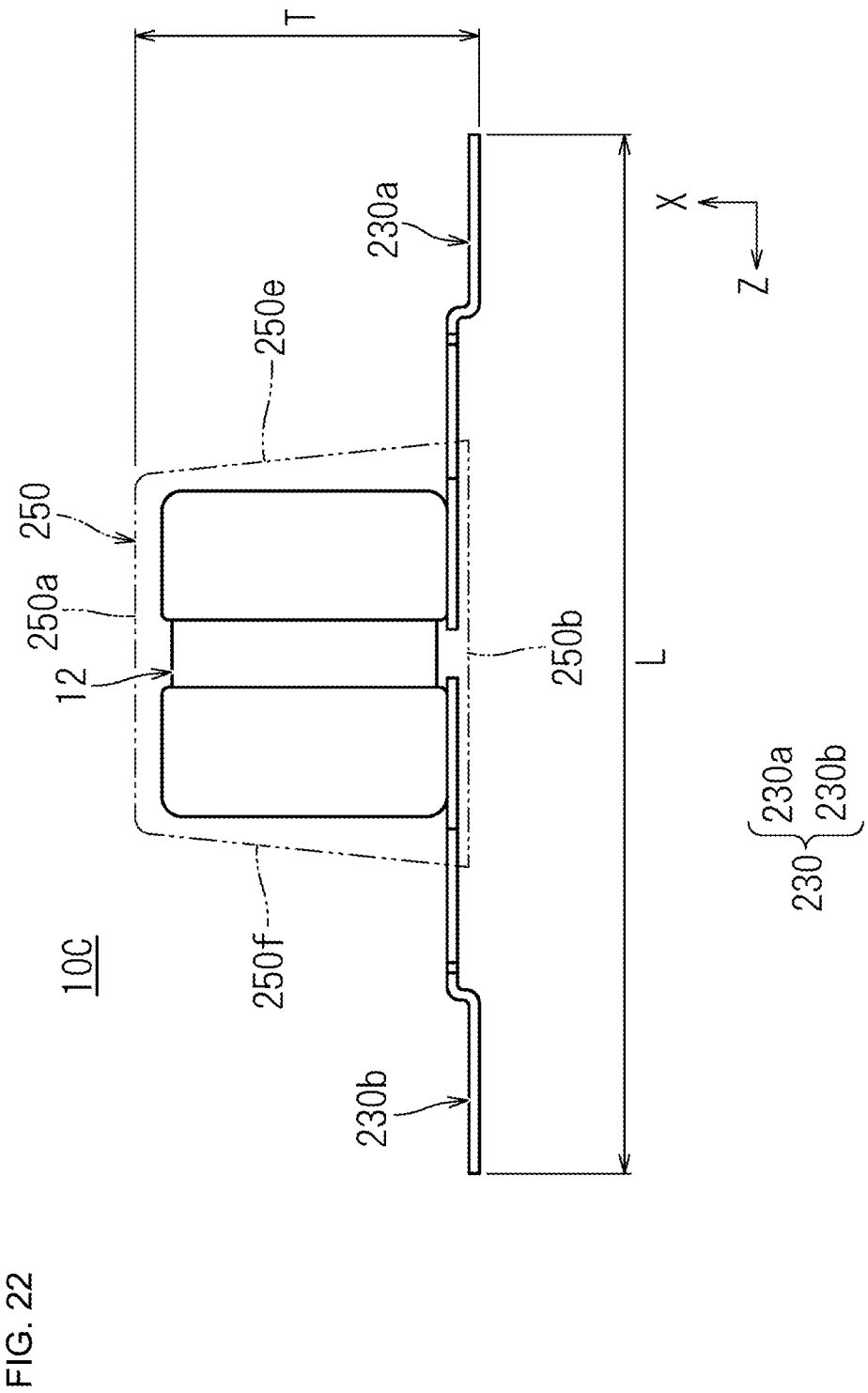
FIG. 22 is a front view of the multilayer ceramic electronic component illustrated in FIG. 21.
Figure 23:
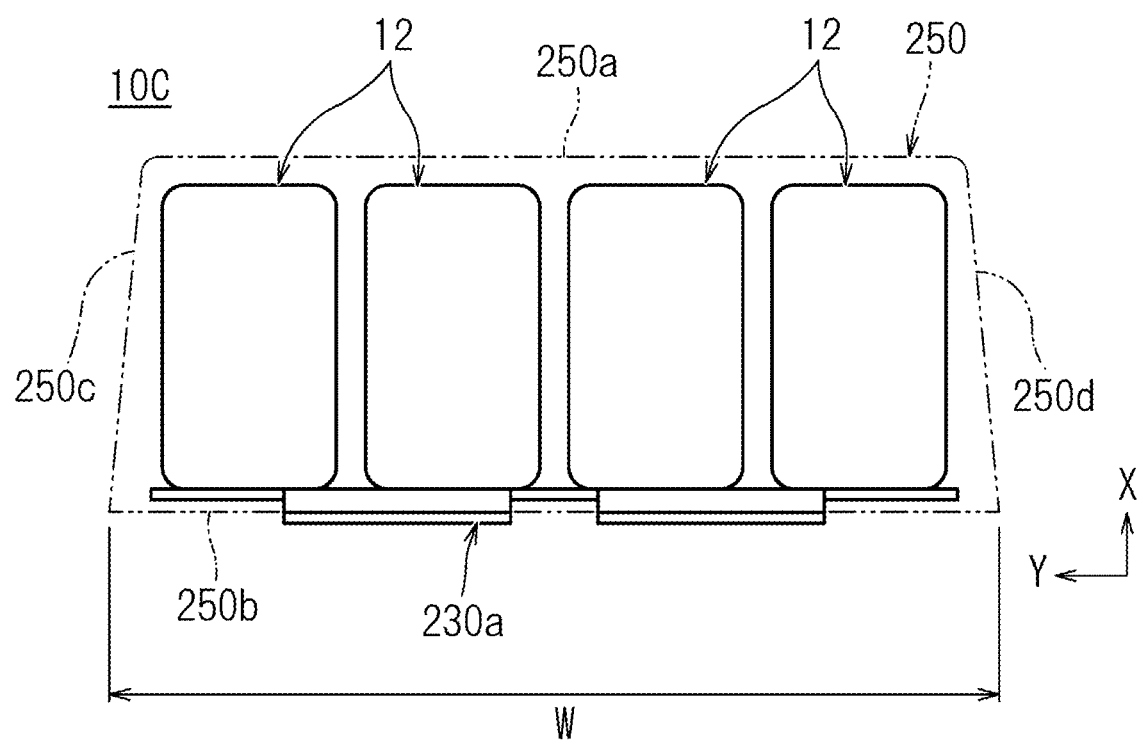
FIG. 23 is a side view of the multilayer ceramic electronic component illustrated in FIG. 21.
Figure 24:
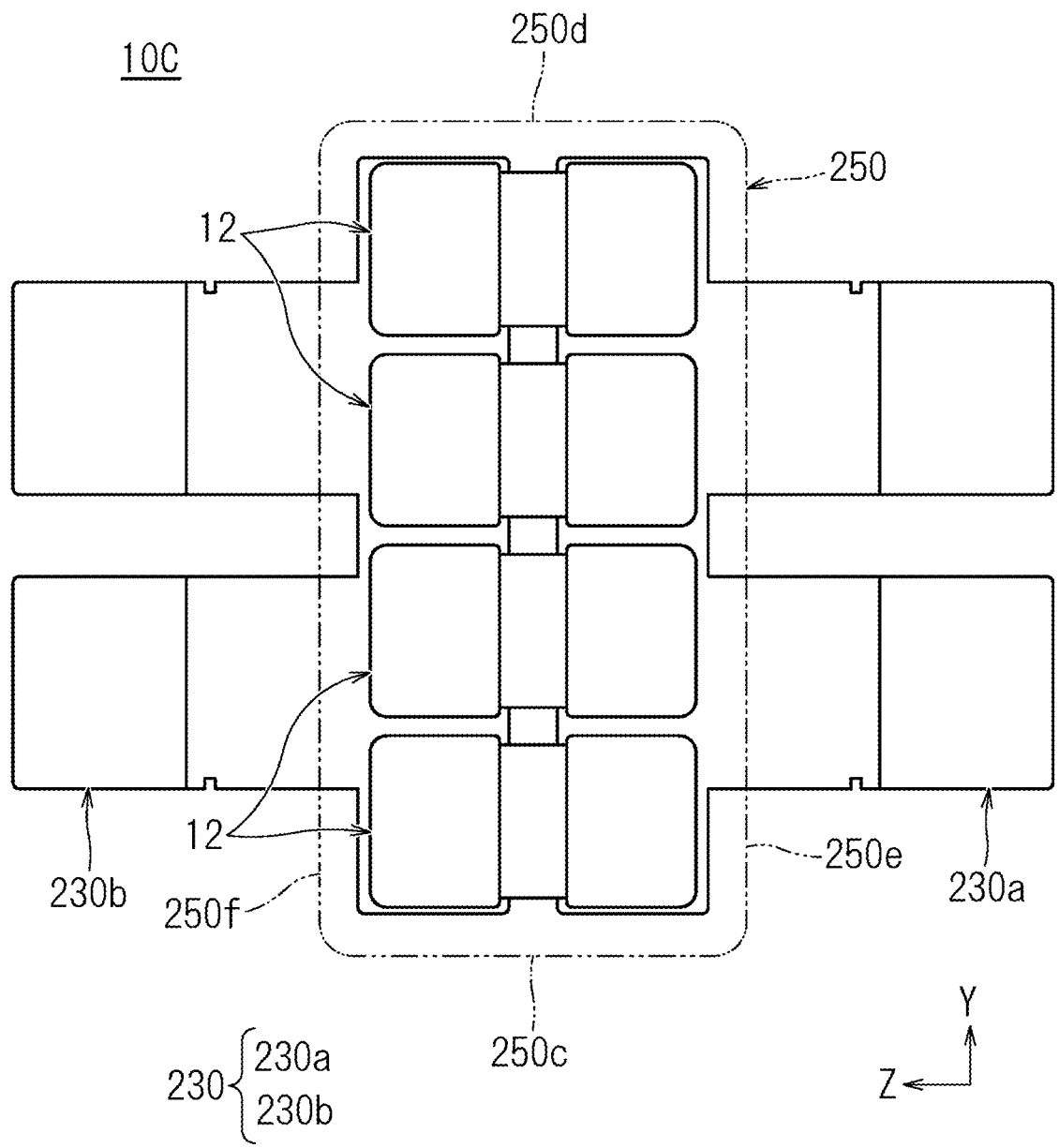
FIG. 24 is a top view of the multilayer ceramic electronic component illustrated in FIG. 21.
Figure 25:
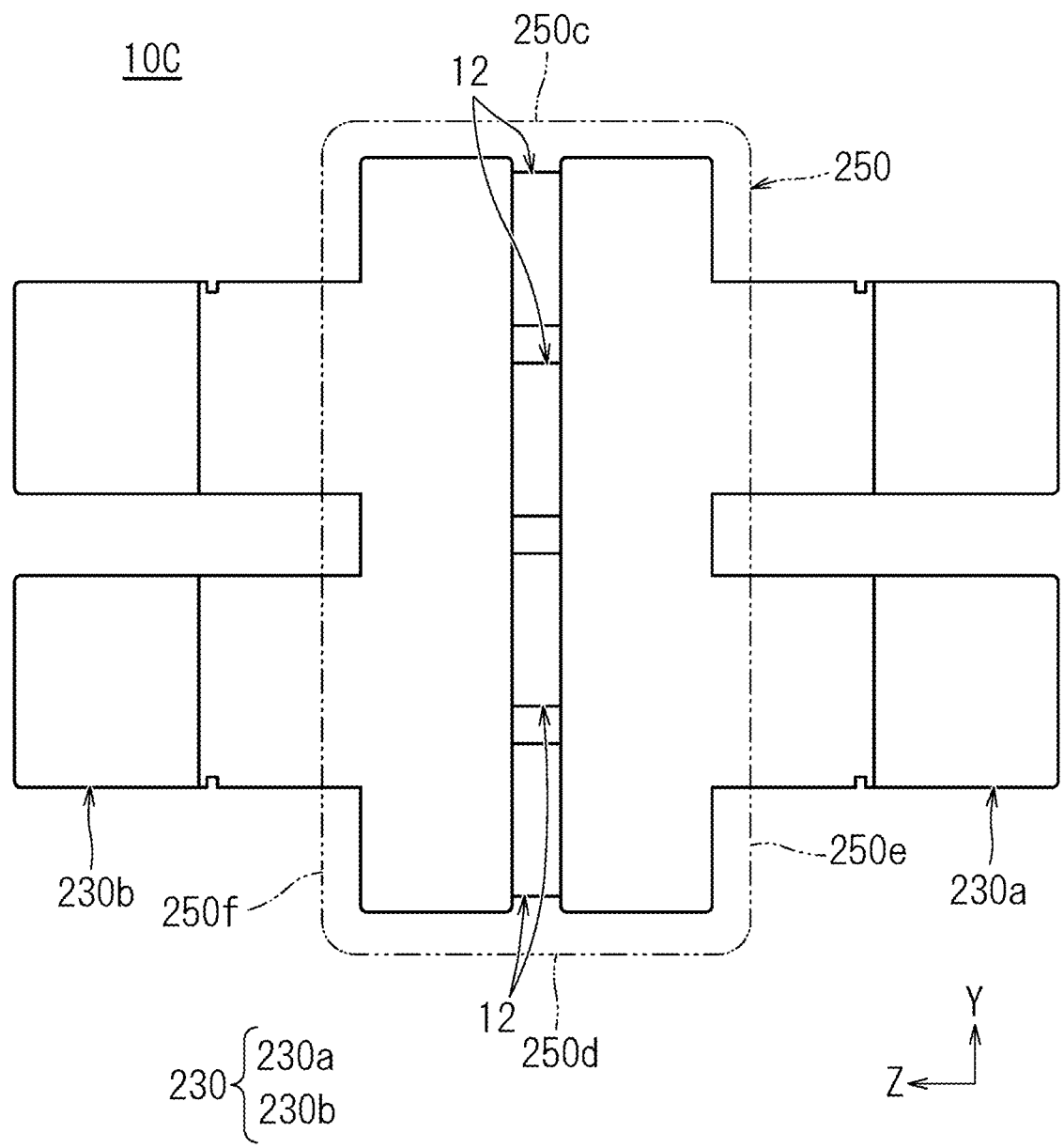
FIG. 25 is a bottom view of the multilayer ceramic electronic component illustrated in FIG. 21.
Figure 26:
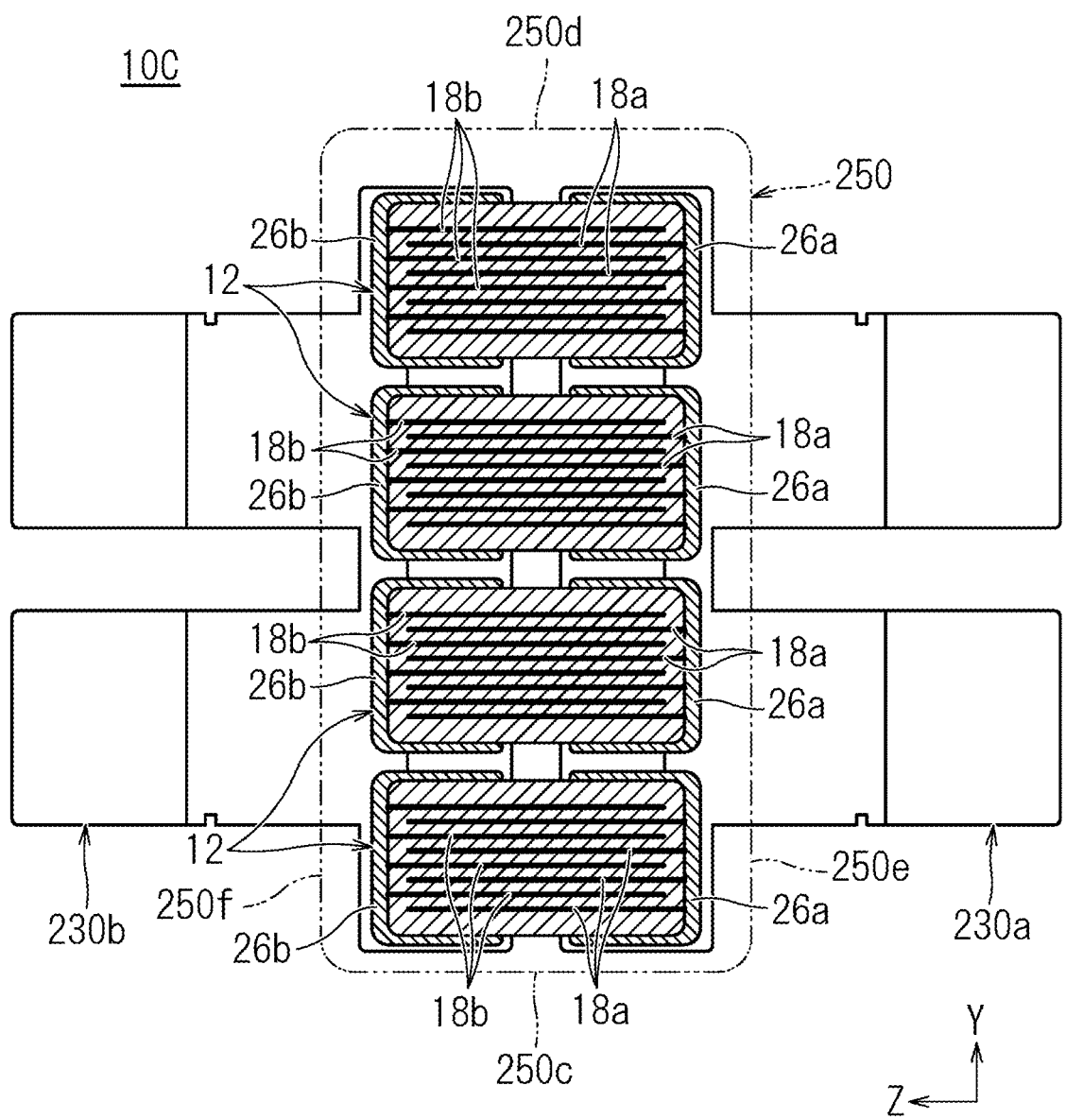
FIG. 26 is a sectional view of the multilayer ceramic electronic component illustrated in FIG. 21 taken along line XXVI-XXVI.
Figure 27:
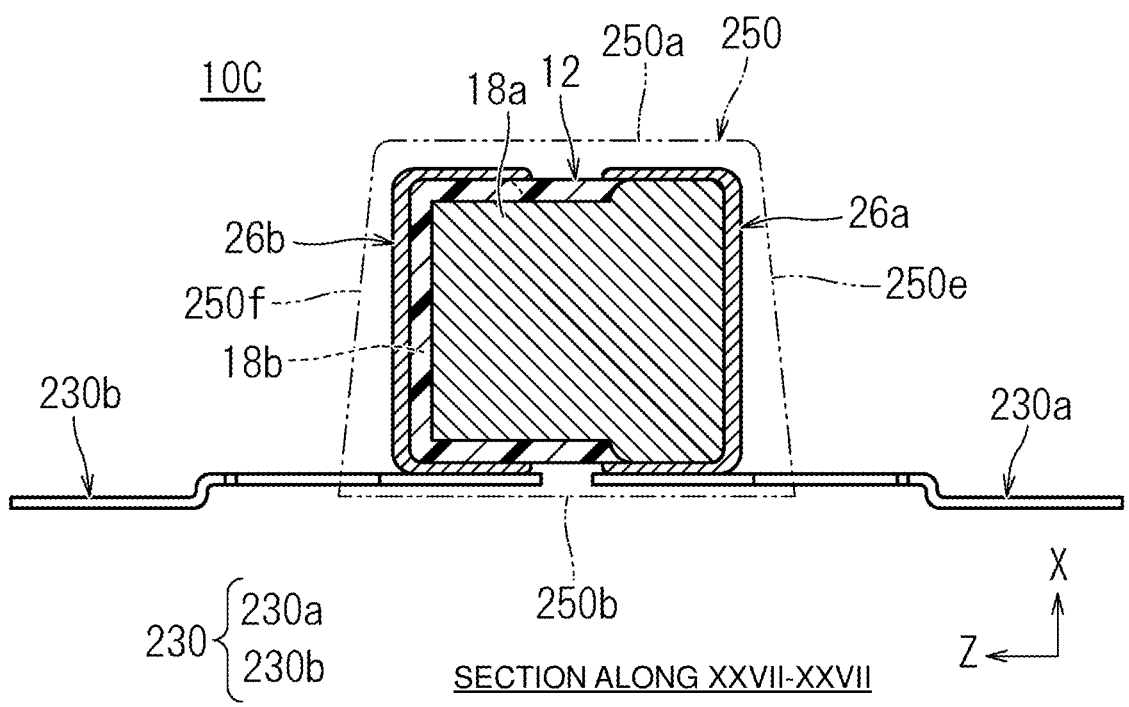
FIG. 27 is a sectional view of the multilayer ceramic electronic component illustrated in FIG. 21 taken along line XXVII-XXVII.
Figure 28:
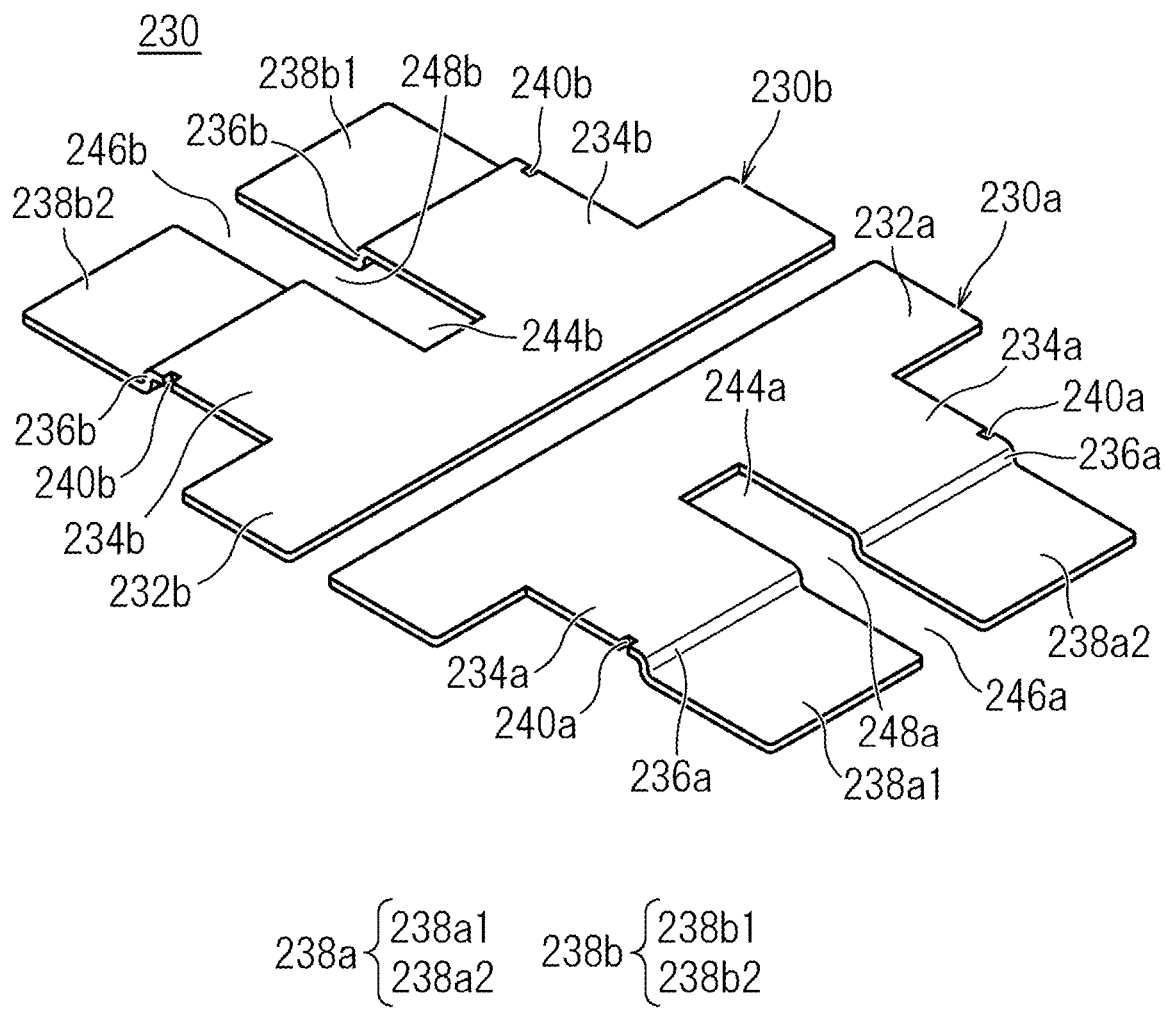
FIG. 28 is an external perspective view of metal terminals included in the multilayer ceramic electronic component according to the third preferred embodiment of the present invention.

A multilayer ceramic electronic component according to a third preferred embodiment of the present invention will now be described. FIG. 21 is an external perspective view of an example of a multilayer ceramic electronic component according to a third preferred embodiment of the present invention. FIG. 22 is a front view of the multilayer ceramic electronic component illustrated in FIG. 21. FIG. 23 is a side view of the multilayer ceramic electronic component illustrated in FIG. 21. FIG. 24 is a top view of the multilayer ceramic electronic component illustrated in FIG. 21. FIG. 25 is a bottom view of the multilayer ceramic electronic component illustrated in FIG. 21. FIG. 26 is a sectional view of the multilayer ceramic electronic component illustrated in FIG. 21 taken along line XXVI-XXVI. FIG. 27 is a sectional view of the multilayer ceramic electronic component illustrated in FIG. 21 taken along line XXVII-XXVII. FIG. 28 is an external perspective view of metal terminals included in the multilayer ceramic electronic component according to the third preferred embodiment of the present invention.

A multilayer ceramic electronic component 10C according to the present preferred embodiment has a structure similar to that of the multilayer ceramic electronic component 10A described with reference to FIG. 1, except that a plurality of multilayer ceramic electronic component bodies 12 are provided and that the structures of a pair of metal terminals 230 and a cover material 250 differ from those of the pair of metal terminals 30 and the cover material 50. Accordingly, components that are the same as or similar to those in the multilayer ceramic electronic component 10A illustrated in FIG. 1 are denoted by the same reference signs, and description thereof is thus omitted.

The multilayer ceramic electronic component 10C according to the third preferred embodiment includes a plurality of multilayer ceramic electronic component bodies 12. Each multilayer ceramic electronic component body 12 includes a rectangular or substantially rectangular-parallelepiped-shaped multilayer body 14 and outer electrodes 26. The multilayer ceramic electronic component 10C also includes metal terminals 230 connected to the outer electrodes 26 of the multilayer ceramic electronic component body 12 and a cover material 250 that covers the multilayer bodies 14, the outer electrodes 26, and portions of the metal terminals 230.

The multilayer ceramic electronic component bodies 12 included in the multilayer ceramic electronic component 10C are also arranged such that the principal surfaces thereof face each other. The multilayer ceramic electronic component bodies 12 of the multilayer ceramic electronic component 10C have gaps therebetween. The gaps are preferably in the range from, for example, about 0.45 mm to about 1.0 mm. In such a case, resin that fills the gaps provides sufficient heat insulation, and the amount of heat generated is able to be reduced.

The direction in which the metal terminals 230 of the multilayer ceramic electronic component 10C extend (in other words, the direction connecting a first end surface 14e and a second end surface 14f of each multilayer ceramic electronic component body 12) is defined as a length direction Z of the multilayer ceramic electronic component 10C. The direction connecting a first principal surface 14a and a second principal surface 14b of each multilayer ceramic electronic component body 12 is defined as a width direction Y of the multilayer ceramic electronic component 10C. The direction connecting a first side surface 14c and a second side surface 14d of each multilayer ceramic electronic component body 12 is defined as a height direction X of the multilayer ceramic electronic component 10C.

The cover material 250 includes a first principal surface 250a and a second principal surface 250b that are respectively adjacent to the first side surface 14c and the second side surface 14d of each multilayer ceramic electronic component body 12; a first side surface 250c and a second side surface 250d that are respectively adjacent to the first principal surface 14a and the second principal surface 14b of each multilayer ceramic electronic component body 12; and a first end surface 250e and a second end surface 250f that are respectively adjacent to the first end surface 14e and the second end surface 14f of each multilayer ceramic electronic component body 12.

The metal terminals 230 of the multilayer ceramic electronic component 10C illustrated in FIG. 21 include a first metal terminal 230a and a second metal terminal 230b.

The first metal terminal 230a is connected to the first outer electrode 26a of each multilayer ceramic electronic component body 12 by a joining material. More specifically, the first metal terminal 230a is connected to the first outer electrode 26a on the first or second side surface 14c or 14d of each multilayer ceramic electronic component body 12.

The second metal terminal 230b is connected to the second outer electrode 26b of each multilayer ceramic electronic component body 12 by a joining material. More specifically, the second metal terminal 230b is connected to the second outer electrode 26b on the first or second side surface 14c or 14d of each multilayer ceramic electronic component body 12.

The first metal terminal 230a includes a first terminal joining portion 232a that is connected to the first outer electrode 26a; a first extending portion 234a that is connected to the first terminal joining portion 232a and extends in a direction parallel or substantially parallel to the first side surface 14c (side surface facing the mounting surface) so as to be spaced apart from the first side surface 14c (side surface facing the mounting surface) and the mounting surface; a second extending portion 236a that is connected to the first extending portion 234a and extends toward the mounting surface positioned opposite each multilayer ceramic electronic component body 12; and a first mounting portion 238a that is connected to the second extending portion 236a and mounted on the mounting board. The structure of the extending portions is not limited to the above-described structure, and a curved extending portion may be additionally provided.

The second metal terminal 230b includes a second terminal joining portion 232b that is connected to the second outer electrode 26b; a third extending portion 234b that is connected to the second terminal joining portion 232b and extends in a direction parallel or substantially parallel to the first side surface 14c (side surface facing the mounting surface) so as to be spaced apart from the first side surface 14c (side surface facing the mounting surface) and the mounting surface; a fourth extending portion 236b that is connected to the third extending portion 234b and extends toward the mounting surface positioned opposite each multilayer ceramic electronic component body 12; and a second mounting portion 238b that is connected to the fourth extending portion 236b and mounted on the mounting board. The structure of the extending portions is not limited to the above-described structure, and a curved extending portion may be additionally provided.

(a) First Terminal Joining Portion and Second Terminal Joining Portion

The first terminal joining portion 232a of the first metal terminal 230a is joined to the first outer electrode 26a on the first side surface 14c (side surface facing the mounting surface) of each multilayer ceramic electronic component body 12. The first terminal joining portion 232a is continuously connected to the first outer electrodes 26a of the multilayer ceramic electronic component bodies 12. The shape of the first terminal joining portion 232a is not particularly limited, and may preferably be a rectangular or substantially rectangular shape such that the first terminal joining portion 232a is continuously connectable to the first outer electrodes 26a of the multilayer ceramic electronic component bodies 12.

Referring to FIGS. 21 and 28, when the first terminal joining portion 232a has a rectangular or substantially rectangular shape such that the first terminal joining portion 232a is continuously connectable to the first outer electrodes 26a of the multilayer ceramic electronic component bodies 12, the length of the first terminal joining portion 232a of the first metal terminal 230a in the width direction Y of the multilayer ceramic electronic component 10C is preferably such that the first terminal joining portion 232a entirely or substantially entirely covers the first outer electrodes 26a on the first side surfaces 14c (side surfaces facing the mounting surface) of the multilayer ceramic electronic component bodies 12 in the lamination direction x. More specifically, the first terminal joining portion 232a is provided as a single joining portion that continuously covers the first outer electrodes 26a on the first side surfaces 14c (side surfaces facing the mounting surface) of all of the multilayer ceramic electronic component bodies 12 from the multilayer ceramic electronic component body 12 closest to the first side surface 250c of the multilayer ceramic electronic component 10C to the multilayer ceramic electronic component body 12 closest to the second side surface 250d of the multilayer ceramic electronic component 10C. Thus, the first terminal joining portion 232a continuously extends over a region including the gaps between the multilayer ceramic electronic component bodies 12. In other words, when two or more multilayer ceramic electronic component bodies 12 are provided, the first terminal joining portion 232a of the first metal terminal 230a is preferably provided to continuously extend between the first outer electrodes 26a of the two or more multilayer ceramic electronic component bodies 12.

The second terminal joining portion 232b of the second metal terminal 230b is joined to the second outer electrode 26b on the first side surface 14c (side surface facing the mounting surface) of each multilayer ceramic electronic component body 12. The second terminal joining portion 232b is continuously connected to the second outer electrodes 26b of the multilayer ceramic electronic component bodies 12. The shape of the second terminal joining portion 232b is not particularly limited, and may preferably be a rectangular or substantially rectangular shape such that the second terminal joining portion 232b is continuously connectable to the second outer electrodes 26b of the multilayer ceramic electronic component bodies 12.

Referring to FIGS. 21 and 28, when the second terminal joining portion 232b has a rectangular or substantially rectangular shape such that the second terminal joining portion 232b is continuously connectable to the second outer electrodes 26b of the multilayer ceramic electronic component bodies 12, the length of the second terminal joining portion 232b of the second metal terminal 230b in the width direction Y of the multilayer ceramic electronic component 10C is preferably such that the second terminal joining portion 232b entirely covers the second outer electrodes 26b on the first side surfaces 14c (side surfaces facing the mounting surface) of the multilayer ceramic electronic component bodies 12 in the lamination direction x. More specifically, the second terminal joining portion 232b is provided as a single joining portion that continuously covers the second outer electrodes 26b on the first side surfaces 14c (side surfaces facing the mounting surface) of all of the multilayer ceramic electronic component bodies 12 from the multilayer ceramic electronic component body 12 closest to the first side surface 250c of the multilayer ceramic electronic component 10C to the multilayer ceramic electronic component body 12 closest to the second side surface 250d of the multilayer ceramic electronic component 10C. Thus, the second terminal joining portion 232b continuously extends over a region including the gaps between the multilayer ceramic electronic component bodies 12. In other words, when two or more multilayer ceramic electronic component bodies 12 are provided, the second terminal joining portion 232b of the second metal terminal 230b is preferably provided to continuously extend between the second outer electrodes 26b of the two or more multilayer ceramic electronic component bodies 12.

One end of the first terminal joining portion 232a of the first metal terminal 230a near one of the multilayer ceramic electronic component bodies 12 that is closest to the first side surface 250c of the multilayer ceramic electronic component 10C preferably protrudes by a distance in the range from, for example, about 0.05 mm to about 0.25 mm from the edge of the first outer electrode 26a on the first side surface 14c (side surface facing the mounting surface) of the multilayer ceramic electronic component body 12 closest to the first side surface 250c of the multilayer ceramic electronic component 10C. In such a case, the multilayer ceramic electronic component bodies 12 may be in contact with the metal terminals 230 in equal or substantially equal areas, and the joining strength and the resistance of the metal terminals 230 may be adjusted within certain ranges.

Similarly, the other end of the first terminal joining portion 232a of the first metal terminal 230a near one of the multilayer ceramic electronic component bodies 12 that is closest to the second side surface 250d of the multilayer ceramic electronic component 10C preferably protrudes by a distance in the range from, for example, about 0.05 mm to about 0.25 mm from the edge of the first outer electrode 26a on the first side surface 14c (side surface facing the mounting surface) of the multilayer ceramic electronic component body 12 closest to the second side surface 250d of the multilayer ceramic electronic component 10C. In such a case, the multilayer ceramic electronic component bodies 12 may be in contact with the metal terminals 230 in equal or substantially equal areas, and the joining strength and the resistance of the metal terminals 230 may be adjusted within certain ranges.

One end of the second terminal joining portion 232b of the second metal terminal 230b near one of the multilayer ceramic electronic component bodies 12 that is closest to the first side surface 250c of the multilayer ceramic electronic component 10C preferably protrudes by a distance in the range from, for example, about 0.05 mm to about 0.25 mm from the edge of the second outer electrode 26b on the first side surface 14c (side surface facing the mounting surface) of the multilayer ceramic electronic component body 12 closest to the first side surface 250c of the multilayer ceramic electronic component 10C. In such a case, the multilayer ceramic electronic component bodies 12 may be in contact with the metal terminals 230 in equal or substantially equal areas, and the joining strength and the resistance of the metal terminals 230 may be adjusted within certain ranges.

Similarly, the other end of the second terminal joining portion 232b of the second metal terminal 230b near one of the multilayer ceramic electronic component bodies 12 that is closest to the second side surface 250d of the multilayer ceramic electronic component 10C preferably protrudes by a distance in the range from, for example, about 0.05 mm to about 0.25 mm from the edge of the second outer electrode 26b on the first side surface 14c (side surface facing the mounting surface) of the multilayer ceramic electronic component body 12 closest to the second side surface 250d of the multilayer ceramic electronic component 10C. In such a case, the multilayer ceramic electronic component bodies 12 may be in contact with the metal terminals 230 in equal or substantially equal areas, and the joining strength and the resistance of the metal terminals 230 may be adjusted within certain ranges.

(b) First Extending Portion and Third Extending Portion

The first extending portion 234a of the first metal terminal 230a is connected to the first terminal joining portion 232a and extends away from the multilayer ceramic electronic component bodies 12 in a direction parallel or substantially parallel to the first or second side surface 14c or 14d (side surface facing the mounting surface).

As illustrated in FIG. 28, the first extending portion 234a may include a first cut portion 244a. In such a case, the amount of material of the metal terminals is able to be reduced, so that the cost is able to be reduced. In addition, the stress applied by the mounting board after the mounting process is able to be reduced.

The third extending portion 234b of the second metal terminal 230b is connected to the second terminal joining portion 232b and extends away from the multilayer ceramic electronic component bodies 12 in a direction parallel or substantially parallel to the first or second side surface 14c or 14d (side surface facing the mounting surface).

As illustrated in FIG. 28, the third extending portion 234b may include a fourth cut portion 244b. In such a case, the amount of material of the metal terminals is able to be reduced, so that the cost is able to be reduced. In addition, the stress applied by the mounting board after the mounting process is able to be reduced.

(c) Second Extending Portion and Fourth Extending Portion

The second extending portion 236a of the first metal terminal 230a is connected to the first extending portion 234a and extends toward the mounting surface to provide a gap between the first or second side surface 14c or 14d that faces the mounting surface and the mounting surface.

As illustrated in FIG. 28, the second extending portion 236a includes a third cut portion 248a at the center or approximate center thereof so that the second extending portion 236a is divided into two portions. Thus, the stress applied by the mounting board after the mounting process is able to be reduced. The second extending portion 236a may instead be divided into three or more portions, or may include no third cut portion 248a.

The second extending portion 236a may include bending cut portions 240a that differ from the above-described cut portion in both end portions thereof in the width direction Y of the multilayer ceramic electronic component 10C. The bending cut portions 240a receive the material of the first metal terminal 230a when the first metal terminal 230a is bent, thus increasing the bendability of the first metal terminal 230a.

The fourth extending portion 236b of the second metal terminal 230b is connected to the third extending portion 234b and extends toward the mounting surface to provide a gap between the first or second side surface 14c or 14d that faces the mounting surface and the mounting surface.

As illustrated in FIG. 28, the fourth extending portion 236b includes a sixth cut portion 248b at the center or approximate center thereof so that the fourth extending portion 236b is divided into two portions. Thus, the stress applied by the mounting board after the mounting process is able to be reduced. The fourth extending portion 236b may instead be divided into three or more parts, or may include no sixth cut portion 248b.

The fourth extending portion 236b may include bending cut portions 240b that differ from the above-described cut portion in both end portions thereof in the width direction Y of the multilayer ceramic electronic component 10C. The bending cut portions 240b receive the material of the first metal terminal 230b when the first metal terminal 230b is bent, thus increasing the bendability of the first metal terminal 230b.

(d) First Mounting Portion and Second Mounting Portion

The first mounting portion 238a of the first metal terminal 230a is connected to the second extending portion 236a and mounted on the mounting board. The first mounting portion 238a extends parallel or substantially parallel to the mounting surface.

The first mounting portion 238a of the first metal terminal 230a preferably has, for example, a substantially continuous rectangular shape.

The length of the first mounting portion 238a in the width direction Y of the multilayer ceramic electronic component 10C is not particularly limited, but is preferably equal or substantially equal to the length of the second extending portion 236a in the width direction Y of the multilayer ceramic electronic component 10C. As illustrated in FIG. 28, an edge of the first mounting portion 238a that is opposite to the edge connected to the second extending portion 236a may include a second cut portion 246a at the center or approximate center thereof. Thus, first mounting tabs 238a1 and 238a2 are provided on both sides of the second cut portion 246a at the edge of the first mounting portion 238a that is opposite to the edge connected to the second extending portion 236a. The second cut portion 246a may be formed by partially cutting the first mounting portion 238a at the center or approximate center thereof. Preferably, the outermost ends of the first mounting portion 238a are aligned with the ends of the second extending portion 236a.

The second mounting portion 238b of the second metal terminal 230b is connected to the fourth extending portion 236b and mounted on the mounting board. The second mounting portion 238b extends parallel or substantially parallel to the mounting surface.

The second mounting portion 238b of the second metal terminal 230b preferably has, for example, a substantially continuous rectangular shape.

The length of the second mounting portion 238b in the width direction Y of the multilayer ceramic electronic component 10C is not particularly limited, but is preferably equal or substantially equal to the length of the fourth extending portion 236b in the width direction Y of the multilayer ceramic electronic component 10C. As illustrated in FIG. 28, an edge of the second mounting portion 238b that is opposite to the edge connected to the fourth extending portion 236b may include a fifth cut portion 246b at the center or approximate center thereof. Thus, second mounting tabs 238b1 and 238b2 are provided on both sides of the fifth cut portion 246b at the edge of the second mounting portion 238b that is opposite to the edge connected to the fourth extending portion 236b. The fifth cut portion 246b may be formed by partially cutting the second mounting portion 238b at the center or approximate center thereof. Preferably, the outermost ends of the first mounting portion 238a are aligned with the ends of the fourth extending portion 236b.

Unlike the cover material 150 of the multilayer ceramic electronic component 10B, the cover material 250 of the multilayer ceramic electronic component 10C illustrated in FIG. 21 preferably has a substantially trapezoidal shape. The cover material 250 may instead have a rectangular or substantially rectangular parallelepiped shape. The cover material 250 fills the gaps between the multilayer ceramic electronic component bodies 12.

The multilayer ceramic electronic component 10C illustrated in FIG. 21 has the same advantageous effects as those of the multilayer ceramic electronic component 10A illustrated in FIG. 1.

2. Method for Manufacturing Multilayer Ceramic Electronic Component

A method for manufacturing the multilayer ceramic electronic component 10A will be described as a non-limiting example of a method for manufacturing a multilayer ceramic electronic component having the above-described structure. In the following description of the manufacturing method, the multilayer ceramic electronic component body 12 is a multilayer ceramic capacitor.

(1) Method for Manufacturing Multilayer Ceramic Electronic Component Body

First, ceramic green sheets are formed by spreading ceramic paste containing ceramic powder by, for example, screen printing, and drying the ceramic paste.

Next, conductive paste for forming the inner electrodes is applied to some of the ceramic green sheets in a certain pattern by, for example, screen printing. Thus, ceramic green sheets on which inner-electrode conductive patterns are formed and ceramic green sheets on which no inner-electrode conductive patterns are formed are prepared. A known binder or solvent may be contained in the ceramic paste or the conductive paste for forming the inner electrodes.

Subsequently, a stack of sheets is formed by stacking a predetermined number of outer-layer ceramic green sheets on which no inner-electrode conductive patterns are formed, ceramic green sheets on which the inner-electrode conductive patterns are formed, and a predetermined number of ceramic green sheets on which no inner-electrode conductive patterns are formed, in that order. The ceramic green sheets on which the inner-electrode conductive patterns are formed are stacked such that extending portions of the inner-electrode conductive patterns are arranged in an alternating pattern.

Subsequently, the stack of sheets is compressed in a lamination direction by a compressing device and is thus formed into a multilayer block.

After that, a raw multilayer chip is formed by cutting the multilayer block into a predetermined shape and size. The raw multilayer chip may be subjected to, for example, barrel grinding to round the corners and ridges thereof.

Subsequently, the raw multilayer chip that has been cut is baked. Thus, a multilayer body in which first and second inner electrode layers are arranged, in which the first inner electrode layers extend to a first end surface, and in which the second inner electrode layers extend to a second end surface is obtained. The baking temperature of the raw multilayer chip depends on the ceramic material and the material of the conductive paste used to form the inner electrodes. Preferably, the baking temperature is in the range from, for example, about 900° C. to about 1300° C.

Next, underlying electrode layers are formed on the multilayer chip that has been baked. First, conductive paste for forming the outer electrodes is applied to both end surfaces of the multilayer chip, and is baked to form a first underlying electrode layer of the first outer electrode 26a and a second underlying electrode layer of the second outer electrode 26b. The baking temperature is preferably in the range from, for example, about 700° C. to about 900° C. When resin layers are to be provided, conductive resin paste containing a metal component for the resin layers and a thermosetting resin is applied and cured to form the resin layers. When the underlying electrode layers are thin film layers or plating layers, the underlying electrode layers are formed by vapor deposition or plating.

After that, plating layers are formed on the surfaces of the underlying electrode layers, and thus the outer electrodes 26 are formed. The multilayer ceramic electronic component body 12 illustrated in FIG. 2 includes Ni plating layers and Sn plating layers as the plating layers formed on the underlying electrode layers. The Ni plating layers and the Sn plating layers are successively formed by, for example, electroplating or electroless plating.

The multilayer ceramic electronic component body 12 illustrated in FIG. 1 is preferably manufactured by the above-described method.

(2) Method for Attaching Metal Terminals

Subsequently, the metal terminals 30 are attached to the multilayer ceramic electronic component body 12.

First, the first metal terminal 30a and the second metal terminal 30b are prepared.

Next, the metal terminals 30 are attached to the outer electrodes 26 of the multilayer ceramic electronic component body 12 by a joining material. In this example, solder is preferably used as the joining material. The solder is heated to a temperature in the range from, for example, about 270° C. to about 290° C. for about 30 seconds in a reflow process.

(3) Method for Forming Cover Material

Subsequently, the cover material 50 of the multilayer ceramic electronic component 10A is formed. The cover material 50 is formed by, for example, transfer molding. More specifically, a multilayer ceramic electronic component on which the cover material 50 is not yet formed is placed in a mold filled with a resin for forming the cover material 50, and then the resin is cured so that the cover material 50 is formed in a predetermined position.

Next, unnecessary portions of the metal terminals 30 are cut off. The metal terminals 30 are cut using, for example, a punching die.

Then, the metal terminals 30 are bent into a desired shape. The metal terminals 30 are bent into a desired shape using, for example, a bending die.

Thus, the multilayer ceramic electronic component 10A illustrated in FIG. 1 is manufactured.

3. Experimental Examples

Multilayer ceramic electronic components were manufactured as Samples 1-1 to 1-7 and Samples 2-1 to 2-6 by the above-described manufacturing method, and the ESR, the thermal resistance, and the direct-current breakdown voltage thereof were measured.

(1) Manufacturing Conditions of Samples of Experimental Examples

Multilayer ceramic electronic components having the specifications provided below were manufactured by the above-described manufacturing method as Samples 1-1 to 1-7:

Size L×W×T of multilayer ceramic electronic component (design values, metal terminals included): about 11.5 mm×about 3.0 mm×about 6.2 mm
Capacitance: about 0.22 µF
Rated working voltage: about 630 V
Number of multilayer ceramic electronic component bodies: 1
Metal terminals
Terminal body: SUS430
Plating film: Two-layer structure including Ni plating layer and Sn plating layer
Distance between the ends of the first and second outer electrodes on the first or second side surface relative to the dimension l in the direction connecting the first and second end faces of the multilayer ceramic electronic component body (length direction Z): see Table 1
Cover material: Epoxy resin The multilayer ceramic electronic component bodies included in the multilayer ceramic electronic components of Samples 1-1 to 1-7 were multilayer ceramic capacitors having the following specifications:

Size l×w×t of multilayer ceramic electronic component body (design values): about 5.7 mm×about 5.0 mm×about 2.0 mm
Material of ceramic layers: $BaTiO_3$
Capacitance: about 0.22 µF
Rated working voltage: about 630 V
Material of inner electrode layers: Ni
Outer electrodes
Underlying electrode layer: Electrode containing Cu and glass
Plating layer: Two-layer structure including Ni plating layer (thickness: about 3.5 µm) and Sn plating layer (about 3.5 µm)

Multilayer ceramic electronic components having the specifications provided below were manufactured by the above-described manufacturing method as Samples 2-1 to 2-6:

Size L×W×T of multilayer ceramic electronic component (design values, metal terminals included): about 11.5 mm×about 2.0 mm×about 2.7 mm
Capacitance: about 0.01 µF
Rated working voltage: about 630 V
Number of multilayer ceramic electronic component bodies: 1
Metal terminals
Terminal body: SUS430
Plating film: Two-layer structure including Ni plating layer and Sn plating layer
Distance between the ends of the first and second outer electrodes on the first or second side surface relative to the dimension l in the direction connecting the first and second end faces of the multilayer ceramic electronic component body (length direction Z): see Table 2
Cover material: Epoxy resin The multilayer ceramic electronic component bodies included in the multilayer ceramic electronic components of Samples 2-1 to 2-6 were multilayer ceramic capacitors having the following specifications:

Size l×w×t of multilayer ceramic electronic component body (design values): about 3.2 mm×about 1.6 mm×about 1.6 mm
Material of ceramic layers: $BaTiO_3$
Capacitance: about 0.01 µF
Rated working voltage: about 630 V
Material of inner electrode layers: Ni
Outer electrodes
Underlying electrode layer: Electrode containing Cu and glass
Plating layer: Two-layer structure including Ni plating layer (thickness: about 3.5 µm) and Sn plating layer (about 3.5 µm)

Figure 29:
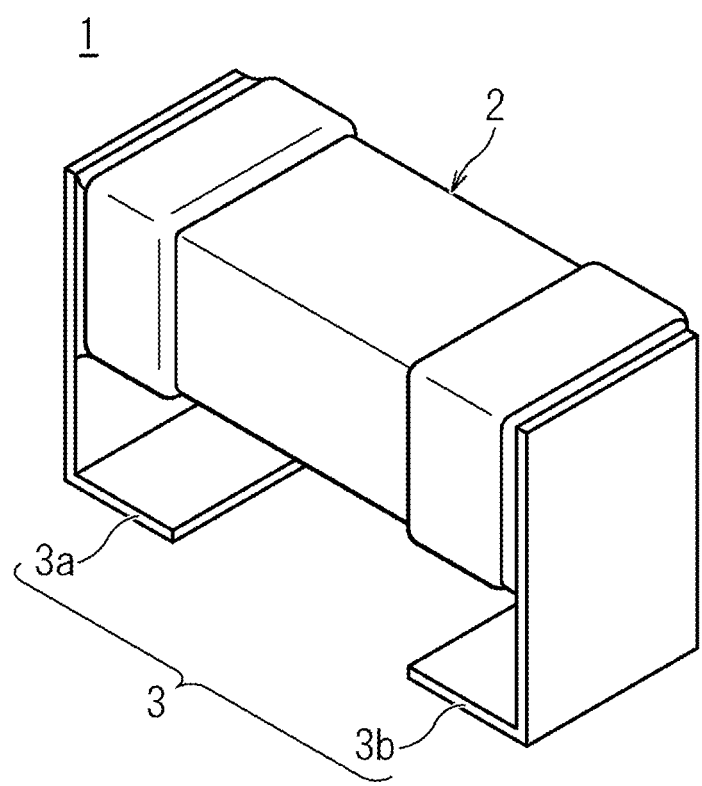
FIG. 29 is an external perspective view of a multilayer ceramic electronic component including metal terminals according to a comparative example.

Multilayer ceramic electronic components including metal terminals having the structure illustrated in FIG. 29 were prepared as Samples 3-1 to 3-3. A multilayer ceramic electronic component 1 includes a multilayer ceramic capacitor 2 and a pair of metal terminals 3. The metal terminals include a first metal terminal 3a and a second metal terminal 3b.

Referring to FIG. 29, in front view, the dimension of the multilayer ceramic electronic component 1 including the metal terminals in a width direction of the multilayer ceramic capacitor 2 is defined as dimension L. The dimension of the multilayer ceramic electronic component 1 including the metal terminals in a front-back direction of the multilayer ceramic capacitor 2 is defined as dimension W. The dimension of the multilayer ceramic electronic component 1 including the multilayer ceramic capacitor 2, the first metal terminal 3a, and the second metal terminal 3b in the height direction is defined as dimension T.

The multilayer ceramic electronic components of Samples 3-1 to 3-3 having the structure of the multilayer ceramic electronic component 1 including the metal terminals had the following specifications:

Size L×W×T of multilayer ceramic electronic component including metal terminals (design values, metal terminals included): about 3.5 mm×about 1.7 mm×about 2.7 mm
Capacitance: about 0.01 µF
Rated working voltage: about 630 V Number of multilayer ceramic electronic component bodies: 1
Metal terminals
  Terminal body: SUS430
  Plating film: Two-layer structure including Ni plating layer and Sn plating layer
  Shape: L-shaped
  Distance between the ends of the first and second outer electrodes on the first or second side surface relative to the dimension l in the direction connecting the first and second end faces of the multilayer ceramic electronic component body (length direction Z): see Table 3

The multilayer ceramic electronic component bodies included in the multilayer ceramic electronic components of Samples 3-1 to 3-3 were multilayer ceramic capacitors having the following specifications:
  Size l×w×t of multilayer ceramic electronic component body (design values): about 3.2 mm×about 1.6 mm×about 1.6 mm
  Material of ceramic layers: $BaTiO_3$
  Capacitance: about 0.01 µF
  Rated working voltage: about 630 V
  Material of inner electrode layers: Ni
  Outer electrodes
    Underlying electrode layer: Electrode containing Cu and glass
    Plating layer: Two-layer structure including Ni plating layer (thickness: about 3.5 µm) and Sn plating layer (about 3.5 µm)

(2) Method for Evaluating Characteristics
(a) Method for Measuring ESR

To measure the ESR, each multilayer ceramic capacitor was subjected to a heat treatment at about 150° C. for about one hour in an air atmosphere before the measurement, and then was mounted on a measurement substrate. Then, about 24±2 hours after the completion of the heat treatment, the ESR was measured using a network analyzer at a measurement frequency of about 100 kHz. A criterion for the advantageous effects of preferred embodiments of the present invention was set to about 5.0 mΩ or less for Samples 1-1 to 1-7 and about 50 mΩ or less for Samples 2-1 to 2-6 and Samples 3-1 to 3-3. This is because Samples 1-1 to 1-7 have a large electrostatic capacitance and therefore tend to have a low ESR.

(b) Method for Determining Thermal Resistance

Before measurement, thermoelectric elements were placed on the surfaces of the multilayer ceramic electronic components of Samples 1-1 to 1-7 and Samples 2-1 to 2-6 and the multilayer ceramic electronic components of Samples 3-1 to 3-3 and on the board surfaces at the ends of the terminals to enable temperature measurement. In addition, the ESR at a certain frequency was measured in advance. A certain current was applied to the multilayer ceramic electronic component of each sample at the same frequency as that at which the ESR was measured, so that the electronic component generated heat. After the temperature of the electronic component was stabilized, the temperature difference between the thermoelectric elements at the above-described two locations was determined, and was divided by the product of the ESR and the square of the current to determine the thermal resistance. A criterion for the advantageous effect of preferred embodiments of the present invention was set to about 23° C./W or less for Samples 1-1 to 1-7 and about 18° C./W or less for Samples 2-1 to 2-6 and Samples 3-1 to 3-3. This is because Samples 1-1 to 1-7 are larger and have lower heat dissipating performance, and therefore, the thermal resistances thereof are relatively high.

(c) Method for Measuring Direct-Current Breakdown Voltage (BDV)

Both terminals of the multilayer ceramic electronic component of each sample were connected to wires from a direct-current power supply, and a voltage was applied to the multilayer ceramic electronic component at a rate of about 100 V/sec. The detection current was set to about 1 mA. When a dielectric breakdown of the multilayer ceramic electronic component body or the cover material occurs, a current of greater than or equal to about 1 mA flows through the circuit, and the voltage increase stops accordingly. The voltage indicated at this time is determined as the direct-current breakdown voltage. In the case in which no cover material is provided as in Samples 3-1 to 3-3, a spatial discharge occurs when the distance between the terminals is short, and the voltage increase stops even when no dielectric breakdown occurs. Therefore, the voltage at the time when the increase thereof stops is determined as the discharge voltage. A criterion for the effect of the present invention was set to about 2.0 kV or greater for all of Samples 1-1 to 1-7, Samples 2-1 to 2-6, and Samples 3-1 to 3-3.

(d) Method for Measuring Distance Between Outer Electrodes and Calculating Percentage of Distance Between Outer Electrodes Each of Samples 1-1 to 1-7, Samples 2-1 to 2-6, and Samples 3-1 to 3-3 was ground so that the cross section along the LT plane at the position of 1/2 W was exposed. Then, the distance between the first and second outer electrodes that face each other was measured by using a microscope. At this time, the length dimension L in the direction connecting the first and second end surfaces of the multilayer ceramic electronic component body was also measured on the ground section. Then, the percentage of the distance between the outer electrodes was calculated as (distance between the outer electrodes)/(dimension L in the direction connecting the first and second end surfaces of the multilayer ceramic electronic component body)×100.

Table 1 shows the measurement results of Samples 1-1 to 1-7. Table 2 shows the measurement results of Samples 2-1 to 2-6, and Table 3 shows the measurement results of Samples 3-1 to 3-3. The samples marked with "*" in Tables 1 to 3 are outside the scope of the present invention.

TABLE 1

|  | Distance between Outer electrodes (mm) | Percentage of Distance between Outer electrodes Relative to Dimension L (%) | ESR (mΩ) | Thermal Resistance (° C./W) | Direct-Current Breakdown Voltage (kV) |
|---|---|---|---|---|---|
| *Sample 1-1 | 3.7 | 64.9 | 6.8 | 37.0 | 2.78 |
| *Sample 1-2 | 2 | 35.1 | 5.2 | 25.0 | 2.83 |
| Sample 1-3 | 1 | 17.5 | 4.3 | 20.0 | 2.62 |
| Sample 1-4 | 0.5 | 8.8 | 4.1 | 19.0 | 2.64 |
| Sample 1-5 | 0.2 | 3.5 | 3.8 | 18.0 | 2.75 |

TABLE 1-continued

|  | Distance between Outer electrodes (mm) | Percentage of Distance between Outer electrodes Relative to Dimension L (%) | ESR (mΩ) | Thermal Resistance (° C./W) | Direct-Current Breakdown Voltage (kV) |
|---|---|---|---|---|---|
| Sample 1-6 | 0.1 | 1.8 | 3.6 | 17.5 | 2.48 |
| *Sample 1-7 | 0.05 | 0.9 | 3.6 | 17.0 | 0.42 |

TABLE 2

|  | Distance between Outer electrodes (mm) | Percentage of Distance between Outer electrodes Relative to Dimension L (%) | ESR (mΩ) | Thermal Resistance (° C./W) | Direct-Current Breakdown Voltage (kV) |
|---|---|---|---|---|---|
| *Sample 2-1 | 1.6 | 50.0 | 58 | 19.0 | 2.90 |
| Sample 2-2 | 1.0 | 31.3 | 47 | 15.0 | 2.83 |
| Sample 2-3 | 0.5 | 15.6 | 42 | 13.0 | 2.94 |
| Sample 2-4 | 0.2 | 6.3 | 38 | 12.0 | 2.56 |
| Sample 2-5 | 0.1 | 3.1 | 36 | 11.7 | 2.76 |
| *Sample 2-6 | 0.1 | 1.6 | 35 | 11.5 | 0.25 |

TABLE 3

|  | Distance between Outer electrodes (mm) | Percentage of Distance between Outer electrodes Relative to Dimension L (%) | ESR (mΩ) | Thermal Resistance (° C./W) | Direct-Current Breakdown Voltage (kV) |
|---|---|---|---|---|---|
| *Sample 3-1 | 1.6 | 50.0 | 55 | 18.0 | 2.85 |
| *Sample 3-2 | 1.0 | 31.3 | 48 | 14.5 | 1.62 |
| *Sample 3-3 | 0.5 | 15.6 | 43 | 13.0 | 1.03 |

Referring to Tables 1 and 2, the percentage of the distance between the outer electrodes relative to the dimension L is in the range from about 1.8% to about 31.3% for each of Samples 1-3 to 1-6 and Samples 2-2 to 2-5. Therefore, the measurement results of the ESR, the thermal resistance, and the direct-current breakdown voltage are satisfactory.

For each of Samples 1-1 and 1-2, the percentage of the distance between the outer electrodes relative to the dimension L is greater than about 31.3%. Accordingly, the ESRs of Samples 1-1 and 1-2 are about 6.8 mΩ and about 5.2 mΩ, respectively, which do not satisfy the criterion, and the thermal resistances of Samples 1-1 and 1-2 are about 37.0° C./W and about 25.0° C./W, respectively. Thus, Samples 1-1 and 1-2 are defective. For Sample 1-7, the percentage of the distance between the outer electrodes relative to the dimension L is less than about 1.8%, and the direct-current breakdown voltage is about 0.42 kV. Thus, Sample 1-7 is also defective.

For Sample 2-1, the percentage of the distance between the outer electrodes relative to the dimension L is greater than about 31.3%. Accordingly, the ESR is about 58 mΩ, which does not satisfy the criterion, and the thermal resistance is about 19.0° C./W. Thus, Sample 2-1 is defective. For Sample 2-6, the percentage of the distance between the outer electrodes relative to the dimension L is less than about 1.8%, and the direct-current breakdown voltage is about 0.25 kV. Thus, Sample 2-6 is also defective.

Samples 3-1 to 3-3 include metal terminals having an L-shaped structure. Sample 3-1 is defective because the ESR thereof is about 55 mΩ, and Samples 3-2 and 3-3 are defective because the direct-current breakdown voltages thereof are about 1.62 and about 1.03, respectively.

The above-described results show that the contact area between an inner electrode and outer electrodes is able to be increased and the ESR and thermal resistance is able to be reduced by forming the inner electrode structure such that each inner electrode layer does not have a rectangular or substantially rectangular shape as in the related art, but is T-shaped or substantially T-shaped and extends to the first or second end surface, a portion of the first side surface, and a portion of the second side surface.

In addition, by making the dimension e of the outer electrodes as large as possible, the above-described advantageous effects are able to be improved. In addition, since the multilayer ceramic electronic component body is molded by the cover material, the risk of surface discharge is able to be reduced.

When the length of the metal terminals is increased along with the dimension e of the outer electrodes, the thermal resistance is able to be further reduced. When the material of the metal terminals is changed from SUS430, which is not highly thermally conductive, to a highly thermally conductive copper-based material, the ESR and thermal resistance are able to be further reduced.

The present invention is not limited to the above-described preferred embodiments of the present invention.

The mechanisms, shapes, materials, numbers, positions, arrangements, and other features, in the above-described preferred embodiments may be modified in various ways without departing from the scope of the present invention, and such modifications are included in the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a multilayer ceramic electronic component body including:
a multilayer body including a plurality of ceramic layers that are laminated and a plurality of inner electrode layers that are laminated, the multilayer body including a first principal surface and a second principal surface that are opposite to each other in a lamination direction, a first side surface and a second side surface that are opposite to each other in a width direction orthogonal or substantially orthogonal to the lamination direction, and a first end surface and a second end surface that are opposite to each other in a length direction orthogonal or substantially orthogonal to the lamination direction and the width direction;
a first outer electrode provided on the first end surface, at least a portion of the first side surface, and at least a portion of the second side surface of the multilayer body; and
a second outer electrode provided on the second end surface, at least a portion of the first side surface, and at least a portion of second side surface of the multilayer body;
a first metal terminal connected to the first outer electrode; and
a second metal terminal connected to the second outer electrode; wherein
the plurality of inner electrode layers include a first inner electrode layer and a second inner electrode layer;
the first inner electrode layer includes a facing portion that faces the second inner electrode layer and a first extended portion that extends to the first end surface, to a portion of the first side surface, and to a portion of the second side surface, respectively;
the second inner electrode layer includes a facing portion that faces the first inner electrode layer and a second extended portion that extends to the second end surface, to a portion of the first side surface, and to a portion of the second side surface, respectively;
the multilayer ceramic electronic component body is disposed such that one of the first side surface and the second side surface faces a mounting surface of a mounting board, and such that the first inner electrode layer and the second inner electrode layer are perpendicular or substantially perpendicular to the mounting surface;
a distance between an end of the first outer electrode on the one of the first side surface and the second side surface and an end of the second outer electrode on the one of the first side surface and the second side surface is in a range from about 1.8% to about 31.3% with respect to a length dimension l of the multilayer ceramic electronic component body in a direction connecting the first end surface and the second end surface of the multilayer ceramic electronic component body;
the first metal terminal includes a first mounting portion extending parallel or substantially parallel to the mounting surface of the mounting board, extending away from the first outer electrode in the length direction, and structured to be mounted on the mounting board;
the second metal terminal includes a second mounting portion extending parallel or substantially parallel to the mounting surface of the mounting board, extending away from the second outer electrode in the length direction, and structured to be mounted on the mounting board;
a length of the first extended portion in the length direction is less than a length of the first outer electrode on the one of the first side surface and the second side surface in the length direction;
a length of the second extended portion in the length direction is less than a length of the second outer electrode on the one of the first side surface and the second side surface in the length direction;
the first metal terminal further includes a first joining portion connected to the first outer electrode and facing the one of the first and second side surfaces;
a width of the first mounting portion in the width direction is smaller than a width of the first joining portion in the width direction;
the second metal terminal further includes a second joining portion connected to the second outer electrode and facing the one of the first and second side surfaces;
a width of the second mounting portion in the width direction is smaller than a width of the second joining portion in the width direction;
the first metal terminal is directly connected to the first outer electrode on only the first or second side surface that faces the mounting surface of the mounting board; and
the second metal terminal is directly connected to the second outer electrode on only the first or second side surface that faces the mounting surface of the mounting board.

2. The multilayer ceramic electronic component according to claim 1, wherein the distance between the end of the first outer electrode on the one of the first and second side surfaces and the end of the second outer electrode on the one of the first and second side surfaces is in the range from about 3.1% to about 31.3% of the length dimension l of the multilayer ceramic electronic component body in the direction connecting the first and second end surfaces of the multilayer ceramic electronic component body.

3. The multilayer ceramic electronic component according to claim 1, wherein two or more of the multilayer ceramic electronic component bodies are spaced apart from each other.

4. The multilayer ceramic electronic component according to claim 3, wherein
the first metal terminal extends between the respective first outer electrodes of the two or more multilayer ceramic electronic component bodies; and
the second metal terminal extends between the respective second outer electrodes of the two or more multilayer ceramic electronic component bodies.

5. The multilayer ceramic electronic component according to claim 1, wherein
the first and second metal terminals each include a terminal body and a plating film provided on a surface of the terminal body; and
the terminal body is made of an oxygen free Cu-based alloy having a high thermal conductivity.

6. The multilayer ceramic electronic component according to claim 1, wherein the multilayer body, the first and second outer electrodes, and at least portions of the first and second metal terminals are covered by a cover material.

7. The multilayer ceramic electronic component according to claim 6, wherein the cover material includes a thermosetting epoxy resin.

8. The multilayer ceramic electronic component according to claim 1, wherein
the first metal terminal further includes:
- a first extending portion connected to the first joining portion and extending away from the multilayer ceramic electronic component body in a direction parallel or substantially parallel to the one of the first and second side surfaces; and
- a second extending portion connected to the first extending portion and extending toward the mounting surface of the mounting board to provide a gap between the one of the first and second side surfaces and the mounting surface;

the first mounting portion is connected to the second extending portion;
the second metal terminal further includes:
- a third extending portion connected to the second joining portion and extending away from the multilayer ceramic electronic component body in a direction perpendicular or substantially parallel to the one of the first and second side surfaces; and
- a fourth extending portion connected to the third extending portion and extending toward the mounting surface of the mounting board to provide a gap between the one of the first and second side surfaces and the mounting surface; and the second mounting portion is connected to the fourth extending portion.

9. The multilayer ceramic electronic component according to claim 8, wherein
the first joining portion of the first metal terminal has a length corresponding to a length of the first outer electrode on the one of the first and second side surfaces; and
the second joining portion of the second metal terminal has a length corresponding to a length of the second outer electrode on the one of the first and second side surfaces.

10. The multilayer ceramic electronic component according to claim 8, wherein
the first joining portion cover the first outer electrode on the one of the first and second side surfaces over an entire or substantially an entire area thereof; and
the second joining portion cover the second outer electrode on the one of the first and second side surfaces over an entire or substantially an entire area thereof.

11. The multilayer ceramic electronic component according to claim 8, wherein each of the second and fourth extending portions includes a bending cut portion in both end portions thereof in the width direction.

12. The multilayer ceramic electronic component according to claim 8, wherein each of the first and third extending portions includes a plurality of cut portions.

13. The multilayer ceramic electronic component according to claim 1, wherein the plurality of ceramic layers are made of $BaTiO_3$, $CaTiO_3$, $SrTiO_3$, or $CaZrO_3$.

14. The multilayer ceramic electronic component according to claim 1, wherein a thickness of each of the plurality of ceramic layers is in a range from about 0.5 μm to about 10.0 μm.

15. The multilayer ceramic electronic component according to claim 1, wherein each of the first and second outer electrodes includes an underlying electrode layer and a plating layer arranged in that order from the multilayer body.

16. The multilayer ceramic electronic component according to claim 15, wherein the underlying electrode layer is a baked layer including glass and metal.

17. The multilayer ceramic electronic component according to claim 16, wherein a thickness of the baked layer is in a range from about 10 μm to about 50 μm.

18. The multilayer ceramic electronic component according to claim 15, wherein the underlying electrode layer is a resin layer having a maximum thickness in a range from about 10 μm to about 150 μm.

19. The multilayer ceramic electronic component according to claim 15, wherein the underlying electrode layer is a thin film layer including metal particles deposited to a thickness of about 1 μm or less.

20. The multilayer ceramic electronic component according to claim 15, wherein the plating layer has a two-layer structure including a Ni plating layer and a Sn plating layer.

* * * * *